US009242626B2

(12) United States Patent
Maruo et al.

(10) Patent No.: US 9,242,626 B2
(45) Date of Patent: Jan. 26, 2016

(54) BRAKE DEVICE

(71) Applicant: HITACHI AUTOMOTIVE SYSTEMS, LTD., Hitachinaka-shi, Ibaraki (JP)

(72) Inventors: Ryohei Maruo, Kawasaki (JP); Chiharu Nakazawa, Kawasaki (JP)

(73) Assignee: HITACHI AUTOMOTIVE SYSTEMS, LTD, Hitachinaka-Shi (JP)

( * ) Notice: Subject to any disclaimer, the term of this patent is extended or adjusted under 35 U.S.C. 154(b) by 0 days.

(21) Appl. No.: 14/379,606

(22) PCT Filed: Jan. 31, 2013

(86) PCT No.: PCT/JP2013/052183
§ 371 (c)(1),
(2) Date: Aug. 19, 2014

(87) PCT Pub. No.: WO2013/125321
PCT Pub. Date: Aug. 29, 2013

(65) Prior Publication Data
US 2015/0061358 A1  Mar. 5, 2015

(30) Foreign Application Priority Data

Feb. 24, 2012  (JP) .................................. 2012-038232

(51) Int. Cl.
| *B60T 13/74* | (2006.01) |
| --- | --- |
| *B60T 13/58* | (2006.01) |
| *B60T 8/17* | (2006.01) |
| *B60T 8/94* | (2006.01) |
| *B60T 13/16* | (2006.01) |
| *B60T 13/66* | (2006.01) |
| *B60T 8/38* | (2006.01) |
| *B60T 8/40* | (2006.01) |

(Continued)

(52) U.S. Cl.
CPC . *B60T 13/58* (2013.01); *B60T 8/17* (2013.01); *B60T 8/38* (2013.01); *B60T 8/4054* (2013.01); *B60T 8/4072* (2013.01); *B60T 8/4081* (2013.01); *B60T 8/4872* (2013.01); *B60T 8/94* (2013.01); *B60T 11/236* (2013.01); *B60T 13/161* (2013.01); *B60T 13/166* (2013.01); *B60T 13/167* (2013.01); *B60T 13/586* (2013.01); *B60T 13/662* (2013.01)

(58) Field of Classification Search
CPC ......... B60T 11/23; B60T 11/26; B60T 13/58; B60T 13/74; B60T 13/586; B60T 13/161; B60T 13/167; B60T 7/042
See application file for complete search history.

(56) References Cited

U.S. PATENT DOCUMENTS

| 7,059,691 B2 | 6/2006 | Tsunehara et al. |
| --- | --- | --- |
| 2004/0212245 A1 | 10/2004 | Tsunehara et al. |

(Continued)

FOREIGN PATENT DOCUMENTS

| JP | 2001-063553 A | 3/2001 |
| --- | --- | --- |
| JP | 2004-345629 A | 12/2004 |
| JP | 2008-265450 A | 11/2008 |

*Primary Examiner* — Christopher Schwartz
(74) *Attorney, Agent, or Firm* — Foley & Lardner LLP

(57) ABSTRACT

A master cylinder 5 includes: a first liquid chamber 51 generating a liquid pressure in response to a brake operation of a driver; and a second liquid chamber 52 communicated with a reservoir 4 and connected to a suction port 70 of a pump 7. In a state in which the reservoir 4 and a suction section 70 of the pump 7 are communicated via the second liquid chamber 52, a liquid pressure of the first liquid chamber 51 can create a wheel cylinder liquid pressure.

20 Claims, 12 Drawing Sheets

(51) Int. Cl.
*B60T 8/48* (2006.01)
*B60T 11/236* (2006.01)

(56) References Cited

U.S. PATENT DOCUMENTS

| | | | | |
|---|---|---|---|---|
| 2010/0001577 A1* | 1/2010 | Hatano | ................ | B60T 8/4081 303/3 |
| 2010/0071546 A1* | 3/2010 | Hanaoka | ................ | F16J 10/04 92/165 R |
| 2012/0006018 A1* | 1/2012 | Klimes | ................ | B60T 11/224 60/591 |
| 2014/0292066 A1* | 10/2014 | Iyatani | ................ | B60T 11/228 303/11 |
| 2015/0007559 A1* | 1/2015 | Oosawa | ................ | B60T 7/042 60/585 |

* cited by examiner

BRAKE DEVICE

TECHNICAL FIELD

The present invention relates to a brake device mounted in a vehicle.

BACKGROUND ART

Conventionally, a brake device in which a suction oil passage of a brake system with a pump as a liquid pressure source is connected to a reservoir not via a pressure chamber (a liquid chamber which generates a liquid pressure in accordance with a brake operation of a driver) of a master cylinder is known.

For example, in a technique described in Patent Document 1, the above-described suction oil passage is communicated with the reservoir via a stroke simulator chamber (a chamber to house a spring of a stroke simulator).

PRE-PUBLISHED DOCUMENT

Patent Document 1: Japanese Patent Application First Publication (tokkai) No. 2008-265450.

DISCLOSURE OF THE INVENTION

Task to be Solved by the Invention

However, in the technique described in Patent Document 1, a high pressure is acted upon a suction side of the pump via the above-described suction oil passage so that there is a possibility of reducing a durability of the pump.

It is, therefore, an object of the present invention to provide a brake device which can suppress a reduction of a durability of a pump.

To achieve the above-described object, in the brake device according to the present invention, preferably, a master cylinder includes: a first liquid chamber generating a liquid pressure in response to a brake operation of a driver; a second liquid chamber communicated with a reservoir and connected to a suction section of a pump. In a state in which the reservoir and the suction section of the pump are communicated via the second liquid chamber, a wheel cylinder liquid pressure can be created by the liquid pressure of the first liquid chamber.

Effect of the Invention

Thus, the reduction of the durability of the pump can be suppressed.

EMBODIMENTS FOR CARRYING OUT THE INVENTION

Hereinafter, preferred embodiments of a brake device according to the present invention will be described on a basis of drawings.

First Embodiment

Figure 1:
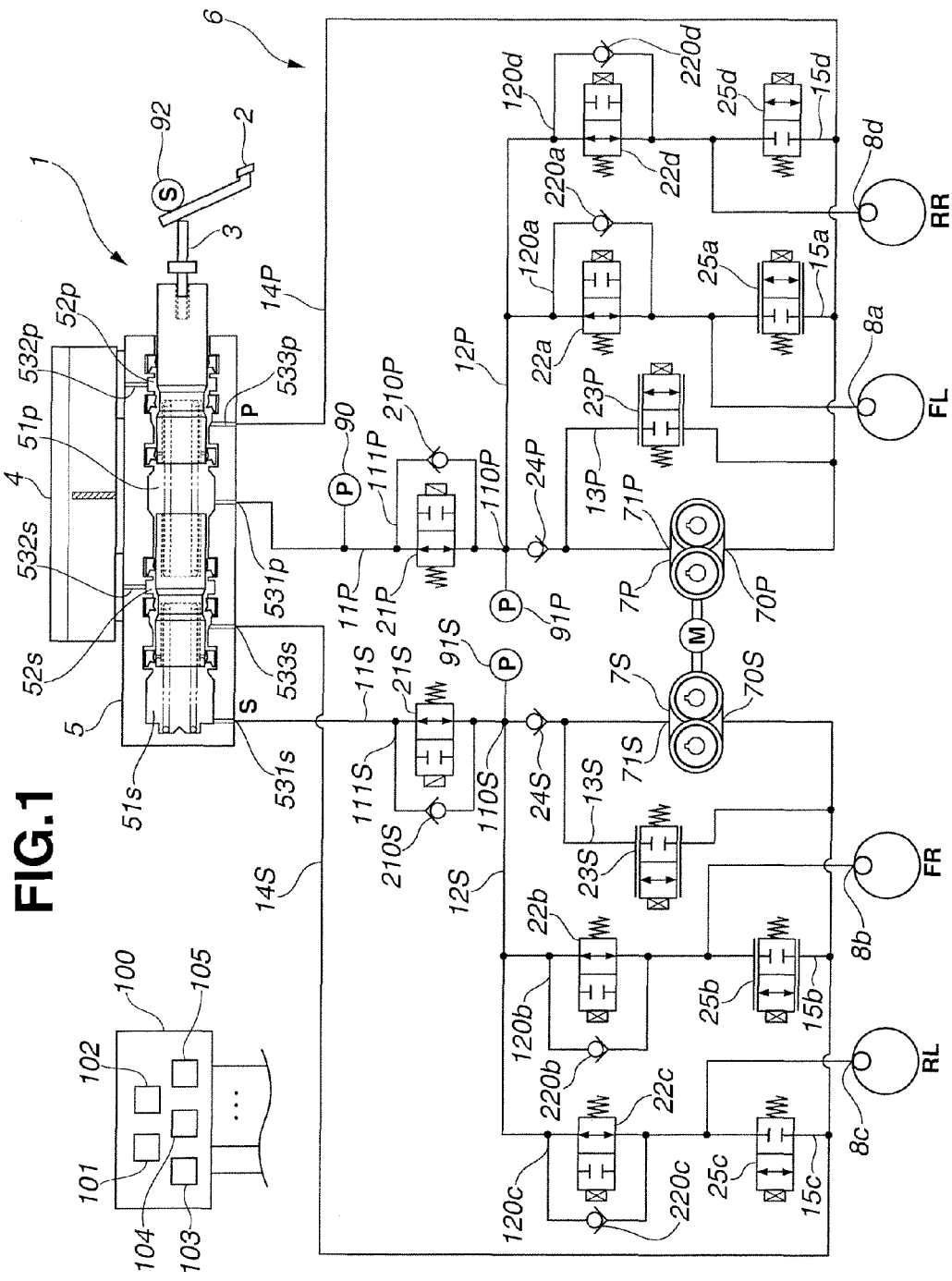
FIG. 1 is a rough view of a brake device in a first embodiment together with a liquid pressure circuit.
Figure 2:
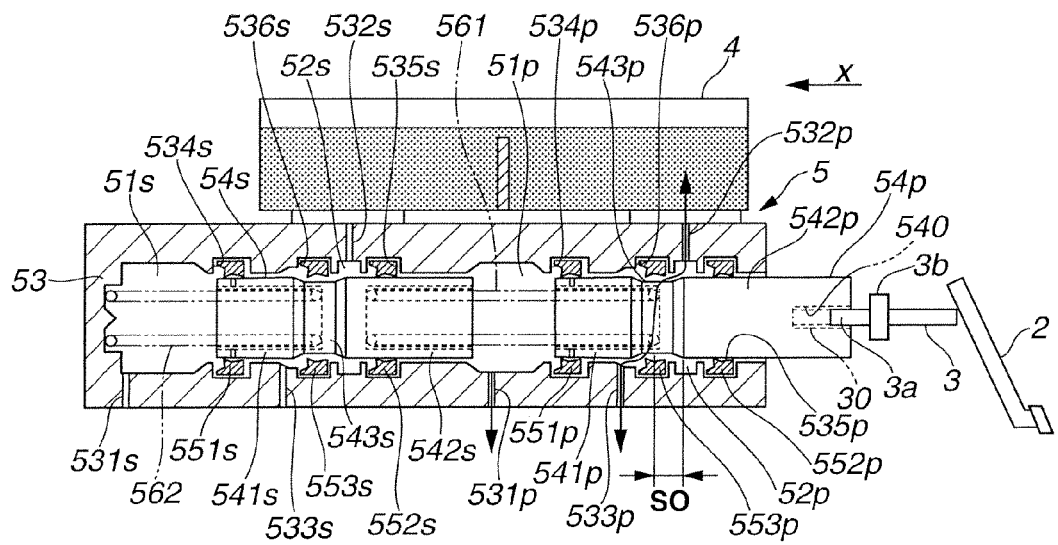
FIG. 2 is a partially cross sectioned view representing an internal structure of a master cylinder in the first embodiment.
Figure 3:
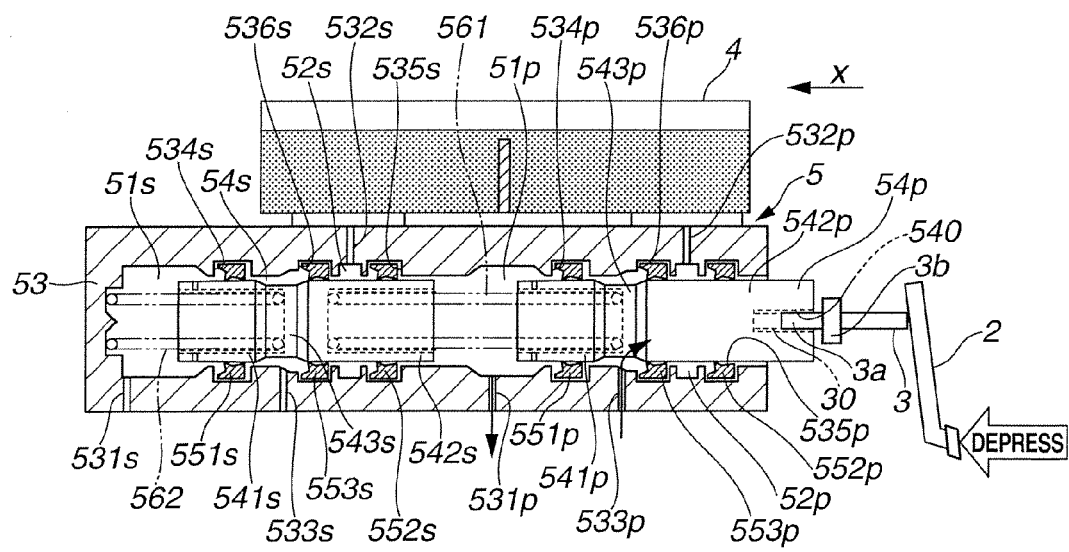
FIG. 3 is a partially cross sectioned view representing the internal structure of the master cylinder in the first embodiment.

FIG. 1 shows a rough configuration view of a brake device 1 in a first preferred embodiment (hereinafter, called device 1) together with a structure of a liquid pressure circuit. FIGS. 2 and 3 are structural views of an internal structure of a master cylinder 5 and representing partial cross sectional views of cutting a cylinder main body 53 with a plane passing through an axial center of a piston 54. FIG. 2 shows a state in which a brake pedal 2 is not depressed and piston 54 does not stroke. FIG. 3 shows a state in which brake pedal 2 is depressed and piston 54 is in a stroke state. Device 1 is applicable to a brake system for an automotive vehicle having a regenerative braking apparatus and is a liquid pressure type brake system for applying a brake liquid pressure (hydraulic pressure) to respective road wheels of the vehicle to generate a braking force. The brake system has a brake piping of two systems (primary p system and secondary s system) and, for example, of an X piping form. It should be noted that another piping system may be adopted.

A subscript of p is added to an end of reference signs for each of members installed for an p system and a subscript of s is added to the end of reference signs for each of members installed for an s system.

Device 1 includes: a brake pedal 2 as a brake operation member which receives an input (depression force) of a brake operation of a driver; a push rod 3 which is an input member of amplifying a depression force of a brake pedal 2 according to an action of a lever; a reservoir tank (hereinafter, called a reservoir) 4 which reserves a brake liquid as a brake liquid source; a master cylinder 5 which generates the liquid pressure according to a force transmitted from push rod 3 as a first brake liquid pressure generation source; a liquid pressure unit 6 which can generate the liquid pressure independently of master cylinder 5 as a second brake liquid pressure generation source; and an electronic control unit (hereinafter, referred to as an ECU) 100 which controls an operation of liquid pressure unit 6 as control means. Liquid pressure unit 6 is interposed between wheel cylinders 8 disposed on respective road wheels FL through RR and master cylinder 5 and includes a pump 7 rotationally driven by means of a drive source to generate the liquid pressure. Device 1 is a brake control apparatus installed to enable a control of the liquid pressure, namely, a liquid pressure braking force of each wheel cylinder 8 independently of the brake operation of the vehicle driver. Device 1 exhibits a boosting function generating an auxiliary force to reduce a brake operation force of the driver according to this brake liquid pressure control, can execute an automatic brake control such as a vehicle dynamics control (VDC) to prevent a side slip of the vehicle, can execute an antilock brake control (ABS) which prevents a vehicular road wheel lock, and can execute a regenerative cooperative control which distributes optimally a regenerative braking force by means of a regenerative braking apparatus and liquid pressure braking force and controlling the liquid pressure braking force to generate the braking force that the driver demands.

A stroke sensor 92 which detects a displacement (a stroke) of brake pedal 2 or push rod 3 is disposed on brake pedal 2 or push rod 3.

As shown in FIG. 2, a brake pedal 2 and piston 54p of master cylinder 5 are connected together with a predetermined gap. In this gap, an elastic member 30 is disposed. Elastic member 30 is preferably made of a coil spring but may be made of another material. Elastic member 30 may be elastically deformed through an operation of brake pedal 2, gives a propelling force to piston 54p, and gives an appropriate reaction force to brake pedal 2. Thus, an appropriate operation feeling of brake pedal 2 is created. Specifically, an axial directional end section 3a of push rod 3 at master cylinder 5 side is reciprocating movably housed within a housing hole 540 installed to be opened to an axial directional end section of piston 54p at push rod 3 side. It should be noted that a gap is provided between axial direction end section 3a of push rod 3 and bottom section of housing hole 540. Elastic member 30 is housed in the gap described above and one end of electric member 30 is contacted on axial directional end section 3a of push rod 3 and the other end section of elastic member is contacted on a bottom section of housing hole 540.

It should be noted that elastic member 30 may be disposed in the gap between brake pedal 2 and piston 54p. For example, elastic member 30 may be disposed in a gap between a flange section 3b installed at an axial middle section of push rod 3 and an axial directional end surface (an outer peripheral section of an opening of housing hole 540) of piston 54p at push rod 3 side.

Master cylinder 5 includes: a first liquid chamber 51 which generates the brake liquid pressure (a master cylinder liquid pressure) in response to the operation of the brake pedal by the driver; and a second liquid chamber 52 communicated with a suction section 70 of pump 7. First and second liquid chambers 51, 52 are disposed to enable a receipt of an auxiliary supply of the brake liquid from reservoir 4. The brake system connecting between first liquid chamber 51 of master cylinder 5 and wheel cylinders 8 constitutes a first system and the brake system including pump 7 and connecting between the second liquid chamber 52 of master cylinder 5 and wheel cylinders 8 constitutes a second system. That is to say, device 1 includes: a first brake liquid pressure creation apparatus which creates the brake liquid pressure by means of the first system; and a second brake liquid pressure creation apparatus which creates the brake liquid pressure by means of the second system.

ECU 100 includes: a brake operation state detecting section 101 configured to detect an operation state of brake pedal 2 by the driver in response to an input of a detection signal of stroke sensor 92; and a target wheel cylinder liquid pressure calculating section 102 configured to calculate a target wheel cylinder liquid pressure on a basis of the detected brake operation state. Target wheel cylinder liquid pressure calculating section 102 calculates the target wheel cylinder liquid pressure to obtain a desired brake characteristic (for example, a predetermined relationship characteristic between the stroke and the wheel cylinder liquid pressure) on a basis of the detected brake operation state. In addition, ECU 100 calculates the target wheel cylinder liquid pressure in a relationship to a regenerative braking force during the regenerative cooperation control. During the execution of VDC, ECU 100 calculates the target wheel cylinder liquid pressure on a basis of, for example, a detected vehicular motion state variable (a lateral acceleration or so forth). ECU 100, on a basis of the calculated target wheel cylinder liquid pressure, switches between the first brake liquid pressure creation apparatus and the second brake liquid pressure creation apparatus and controls the operation of the second brake liquid pressure creation device. ECU 100 includes: a pressure increase control section which controls each actuator (second brake liquid pressure creation apparatus) of liquid pressure unit 6 to increase the liquid pressure of each wheel cylinder 8; and a decrease pressure control section 104 which decreases the liquid pressure of each wheel cylinder 8; and a hold (holding) control section 105 which holds the liquid pressure of each wheel cylinder 8.

Master cylinder 5 is a tandem type master cylinder which generates the liquid pressure (the master cylinder liquid pressure) in accordance with the brake operation of the driver. Master cylinder 5, as shown in FIG. 2, includes: a bottomed cylindrical cylinder main body 53; two pistons 54p, 54s slidably inserted into an inner peripheral surface of cylinder main body 53 and interlinked with brake pedal 2; and piston seals 55 which are a plurality of seal members to seal between the inner peripheral surface of cylinder main body 53 and outer peripheral surfaces of pistons 54p, 54s. It should be noted that, for explanation convenience, an x axis is provided along a direction toward which an axle of piston 54 is extended and a direction opposite to brake pedal 2 (a direction in which piston 54 is in a stroke state in accordance with the depression of brake pedal 2) is a positive direction.

Cylinder main body 53 includes: a drain port (supply port) 531 connected to wheel cylinders 8 and communicably installed to wheel cylinders 8; an auxiliary supply port 532 connected to reservoir 4 and communicated with this reservoir; and a suction port 533 connected to suction section 70 of pump 7 and communicated with this suction port 70. These ports 531, 532, 533 are installed for each of p system and s system.

P system ports 531 through 533 are disposed at a negative direction side of x axis of cylinder main body 53 and s system ports 531 through 533 are disposed toward the positive direction side of x axis.

In each system, suction port 531 is disposed toward a more axial position direction side than auxiliary supply port 532.

Suction port 533 is disposed toward a predetermined position in the x axis direction between these ports 531, 532. A plurality of annular grooves which surround an axial center and extended in a peripheral direction are formed on an inner peripheral wall of cylinder main body 53. In each of p and s systems, a first annular groove 534 is formed at an x axis direction predetermined position between drain port 531 and suction port 533. A second annular groove 535 is formed toward more x axis negative direction side than auxiliary supply port 532. A third annular groove 536 is formed at the x-axis direction predetermined position between auxiliary supply port 532 and suction port 533.

Piston 54 includes a p system piston 54p and an s system piston 54s. Piston 54s is housed at the x-axis positive direction side of cylinder main body 53 and piston 54p is housed at the x-axis negative direction side of cylinder main body 53 and connected to input member (push rod) 3.

A coil spring 561, as a first biasing member, is interposed between both pistons 54p, 54s in a compressed state. Another coil spring 562, as a second biasing member, is interposed between piston 54s and the x-axis positive direction end section of cylinder main body 53.

Piston 54p is biased toward the x-axis negative direction side by means of coil spring 561 and is biased toward the x-axis positive direction side via input member 3 in response to the depression on brake pedal 2.

Piston 54s is biased toward the x-axis positive direction side by means of coil spring 561 and biased toward the x-axis negative direction side by means of coil spring 562. Coil springs 561, 562 are return springs of piston 54. Each piston 54 includes: a first large-diameter section 541 formed at the x-axis positive direction side; a second large diameter section 542 formed at the x-axis negative direction side; and a small diameter section 543 formed between first large diameter section 543 and second large diameter section 542. A part between small diameter section 543 and large diameter sections 541, 542 is formed in a taper shape and both sections are moderately connected without an abrupt step difference.

Piston seals 55 are, respectively, disposed in annular grooves 534, 535, 536 of cylinder main body 53. A first piston seal 551 is disposed in a first annular groove 534 and slidably contacted on a first large diameter section 541 of piston 54. A second piston seal 552 is disposed in a second annular groove 535 and slidably contacted on a second large diameter section 542 of piston 54. A third piston seal 553 is disposed in a third annular groove 536 and is interposed between first piston seal 551 and second piston seal 552. First piston seal 551 defines first liquid chamber 51 at its x-axis positive direction side.

First liquid chamber 51 is mainly constituted by a space between the x-axis direction end surface of piston 54 and an inner peripheral surface of cylinder main body 53. A drain port 531 is, at all times, opened on first liquid chamber 51. Second piston seal 552 defines second liquid chamber 52 together with first piston seal 551.

Second liquid chamber 52 is mainly constituted by a space between an outer peripheral surface of piston 54 and an inner peripheral surface of cylinder main body 53. Second liquid chamber 52 is, at all times, opened to auxiliary supply port 532 and suction port 533.

As shown in FIG. 2, in a state in which brake pedal 2 is not depressed, a predetermined x-axis direction distance SO is provided between the x-axis positive direction end of second large diameter section 542 of piston 54 and (a lip section of) an inner diameter side end section of third piston seal 553. If stroke S of piston 54 is shorter than above-described distance SO (hereinafter referred to as a predetermined stroke) (0≤S<SO), third piston seal 553 is placed at a position surrounding small diameter section 543 (and a tapered connection section) of piston 54 and does not slidably contact on an outer periphery of piston 54 (small diameter section 543). On the other hand, as shown in FIG. 3, if stroke S of piston 54 is equal to or longer than predetermined stroke SO (S≥SO), third piston seal 553 is slidably contacted on second large diameter section 542 of piston 54. It should be noted that predetermined stroke SO is set to a maximum value of a range in which piston 54 strokes according to the ordinary brake operation of the driver (operational force and operation quantity (manipulation variable)).

Each piston seal 55 is a well known seal member (a cup seal) of a cup shape in cross section having a lip section at the inner diameter side. In a state in which the lip section is slidably contacted on an outer peripheral surface of piston 54, a unidirectional flow of the brake liquid is allowed but the flow of another direction of the brake liquid is limited. First piston seal 551 allows only the flow of the brake liquid from second liquid chamber 52 to first liquid chamber and disposed toward a direction at which the flow of the brake liquid from first liquid chamber 51 to second liquid chamber 52 is suppressed.

The p system of second piston seal 552 is disposed in a direction at which the flow of the brake liquid from second liquid chamber 52p to an external of master cylinder 5 is suppressed. The s system of second piston seal 552 is disposed in a direction at which the flow of the brake liquid from the p system first liquid chamber 51p to second liquid chamber 52s is suppressed. Third piston seal 553 is disposed in a direction in which only the flow of the brake liquid from auxiliary supply port 532 to suction port 533 is allowed in a state in which third piston seal 553 is slidably contacted on second large diameter section 542 (namely, piston 54 is stroked equal to or longer than SO) and the flow of the brake liquid from suction port 533 to auxiliary supply port 532 is suppressed.

A volume of first liquid chamber 51 is contracted and the liquid pressure is, then, generated when piston 54 strokes in the x-axis positive direction side in response to the brake operation by the driver. Thus, the brake liquid is supplied toward wheel cylinders 8 via drain port 531 from first liquid chamber 51.

It should be noted that, in both of p system and s system, the substantially same liquid pressure is generated in first liquid chambers 51p, 51s.

If stroke S of piston 54 is shorter than SO, the communication between auxiliary supply port 532 and suction port 533 is not interrupted but is allowed by means of third piston seal 553, as shown in FIG. 2. Thus, the pressure of second liquid chamber 52 is substantially the same low pressure (the atmospheric pressure) as reservoir 4.

When piston 54 is stroked by a distance longer than SO toward x axis positive direction side in response to the brake operation by the driver, the communication between auxiliary supply port 532 and suction port 533 is interrupted in second liquid chamber 52 as shown in FIG. 3. Specifically, in second liquid chamber 52, the flow of the brake liquid from suction port 533 to auxiliary supply port 532 is suppressed (only the flow of the brake liquid from auxiliary supply port 532 and suction port 533 is allowed).

Liquid pressure unit 6 is installed to enable a separate supply of the master cylinder liquid pressure or a controlled liquid pressure to each wheel cylinder 8. Liquid pressure unit 6 is provided with pump 7 which is a liquid pressure generation source and a plurality of control valves (electromagnetic valves) as liquid pressure equipments (actuators) to generate a controlled liquid pressure supplying each wheel cylinder 8.

Pump 7 is a gear pump rotationally driven by means of a motor M and which is superior in a sound and vibration performance or so forth and an external gear pump is adopted as pump 7 in this embodiment.

Pumps 7p, 7s of both systems are driven by the same motor M. As shown in FIG. 1, liquid pressure unit 6 includes: a first oil passage 11 connecting drain port 531 of master cylinder 5 and drain section 71 of pump 7; a normally open gate out valve (interrupting valve) 21 disposed in first oil passage 11; a second oil passage 12 branched from a branch section 110 between drain section 71 of pump 7 in first oil passage and gate out valve 21 and connected to each of wheel cylinders 8; a normally open pressure increase valve 22 disposed in second oil passage 12; a suction oil passage 14 connecting suction port 533 of master cylinder 5 and suction section 70 of pump 7; a pressure decrease oil passage 15 connecting second oil passage 12 and suction oil passage 14; a normally closed pressure decrease valve 25 disposed in pressure decrease oil passage 15; a third oil passage 13 connecting a part of first oil passage between drain section 71 of pump 7 and a branch section 110 and suction oil passage 14; and a normally closed recirculation valve 23 disposed in third oil passage 13.

It should be noted that, for the members installed to correspond to respective road wheels FL through RR, subscripts a through d are added at the end of the corresponding reference signs.

At least one of pressure decrease valves 25 of the respective systems (in this embodiment, pressure decrease valves 25a, 25b of front road wheels FL, FR) and recirculation valve 23 are proportional control valves and the other valves are on-or-off valves.

In first oil passage 11, an oil passage 111 is disposed in parallel to gate out valve 21. In oil passage 111, a check valve 210 which allows only the flow of the brake liquid from drain port 531 side of master cylinder 5 toward drain section 71 (second oil passage 12) side of pump 7 and inhibits the opposite directional flow is disposed.

Check valve 210 is a relief valve in which, when the liquid pressure at master cylinder 5 side becomes higher than the liquid pressure of the draining side of pump 7 (wheel cylinder 8 side) even if gate out valve 21 is closed, the valve is open to enable the brake liquid supply to wheel cylinder 8 side. Check valve 210 serves to suppress a generation of a solid plate depression state with respect to the brake operation by the driver.

A check valve (a draining valve of pump 7) 24 is disposed between branch section 110 and drain section 71 of pump 7. Check valve 24 serves to allow only the flow of the brake liquid from drain section 71 side to branch section 110 side and to inhibit the opposite directional flow. Check valve 24 serves to suppress a high pressure from master cylinder 5 (first liquid pressure 51) side being acted upon drain section 71 of pump 7 due to the brake operation by the driver. Thus, a durability of pump 7 is improved.

In second oil passage 12, an oil passage 120 is disposed in parallel to a pressure increase valve 22.

In oil passage 120, a check valve 220 is disposed which allows only the flow of the brake liquid from wheel cylinder 8 side to branch section 110 side and inhibits the flow of the opposite directional flow.

Check valve 220 is (valve) opened when the brake liquid is returned from wheel cylinder 8 side toward the master cylinder 5 side via second oil passage 12 (pressure increase valve 22) and returns the brake liquid via oil passage 120 (check valve 220) so that a pressure decrease of the wheel cylinder liquid pressure can smoothly be carried out.

Suction oil passage 14 connects a low pressure side of pressure decrease valve 25 (opposite side to wheel cylinder 8 side) and a low pressure side (suction section 70) of pump 7 directly to suction port 533 of master cylinder 5 not via an internal reservoir or so forth.

In each of p and s systems, a liquid pressure sensor 91 which detects the liquid pressure (pump draining pressure) at this location (branch section 110) is disposed between (branch section 110) drain section 71 of pump 7 and gate out valve 21 and in first oil passage 11. A detected value of this sensor 91 is inputted to ECU 100. In addition, in the p system, a liquid pressure sensor 90 is disposed between drain port 531 of master cylinder 5 and gate out valve 21 and in first oil passage 11p to detect the liquid pressure at this location and its detection value is inputted to ECU 100. Since, in p system and s system, the substantially the same liquid pressure is generated in first liquid chambers 51p, 51s, the liquid pressure detected by liquid pressure sensor 90 is the liquid pressure (master cylinder liquid pressure) of first liquid chambers 51p, 51s.

Action of the First Embodiment

Next, an action of device 1 will be described below.

Hereinafter, a state in which stroke S of piston 54 of master cylinder 5 is placed at a position shorter than predetermined stroke S0 and auxiliary supply port 532 and suction port 533 are communicated is called a first state and a state in which piston 54 strokes at a position equal to or longer than S0 and auxiliary supply port 532 and suction port 533 are interrupted (to each other) (the flow of the brake liquid from auxiliary supply port 532 to suction port 533 is allowed and the flow of the opposite direction is suppressed) is called a second state.

Device 1 is installed to enable creation of the wheel cylinder liquid pressure according to the liquid pressure of first liquid chamber 51 (namely, according to the first system) in the first and second states (namely, irrespective of stroke S). This liquid pressure creation means constitutes the first brake liquid pressure creation apparatus. In addition, when a regenerative braking apparatus is being operated, pump 7 is operated on a basis of the brake operation state detected by means of brake operation state detecting section 101 (namely, by the second system)

This liquid pressure creating means constitutes a second brake liquid pressure creation apparatus.

FIGS. 4 through 10 show operation states of liquid pressure unit 6 when the respective functions of device 1 are achieved. A bold solid line denotes rough flows of the brake liquid.

(Ordinary Brake: During an Initial Brake Depressing)

Device 1 creates the wheel cylinder liquid pressure by means of first brake liquid pressure creation apparatus (first system) in an initial stage of braking, viz., under a predetermined low pressure area after a start of the brake operation.

Specifically, ECU 100, when the start of the brake operation is detected by means of brake operation state detecting section 101, turns in a no power supply state (off) for liquid pressure unit 6 and turns in a no operation state for pump 7 and respective valves (no power supply state) in a case where the calculated target wheel cylinder liquid pressure is equal to or lower than a predetermined liquid pressure (for example, corresponds to a maximum value of a vehicular deceleration generated in an ordinary brake operation not abrupt braking).

Figure 4:
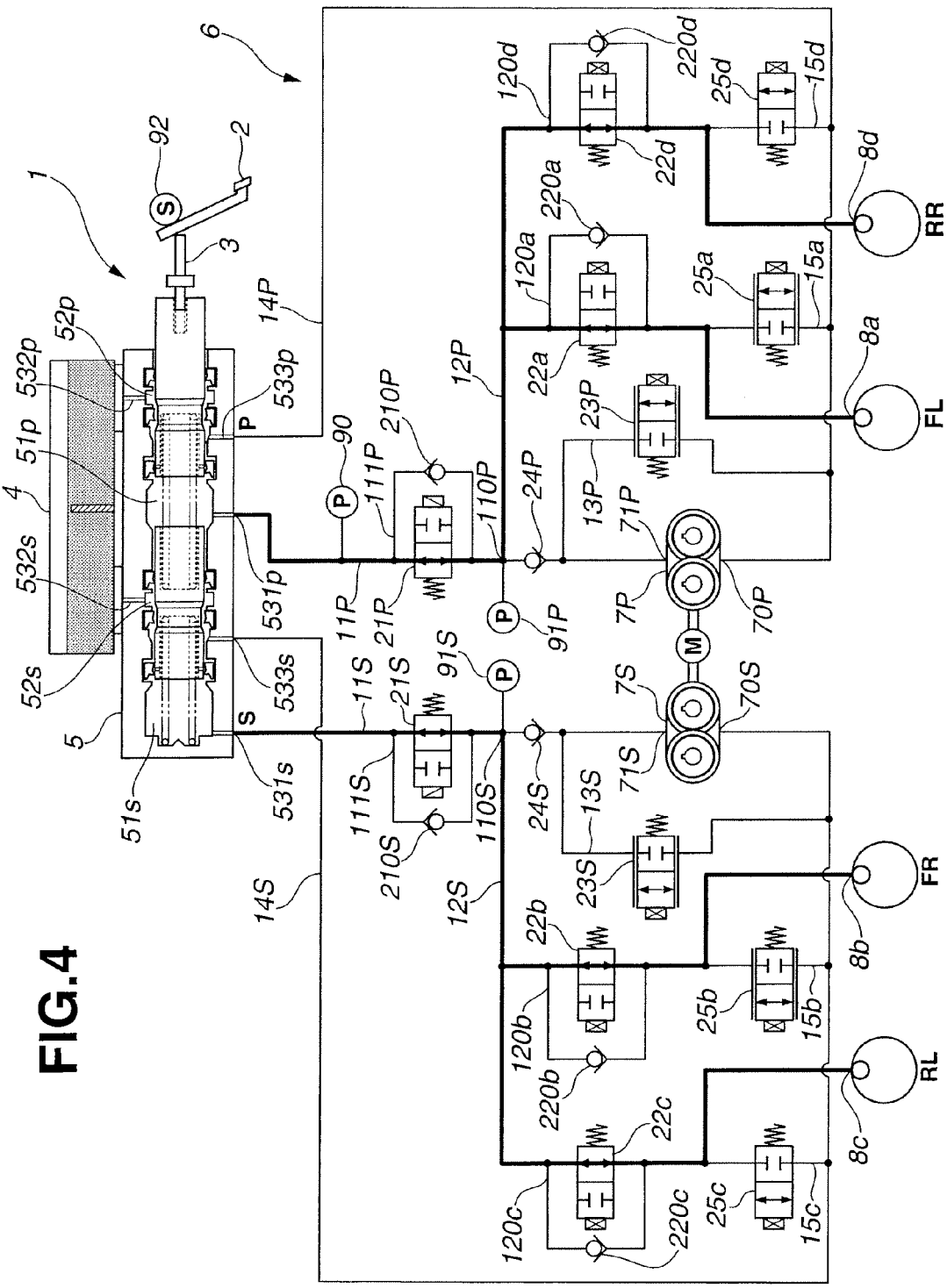
FIG. 4 is a representation of a flow of a brake liquid at a time of an ordinary brake operation (an initial depression time) in the liquid pressure circuit of the brake device in the first embodiment.

Thus, as shown in FIG. 4, the brake liquid is supplied toward respective wheel cylinders 8 from master cylinder 5 (first liquid chamber 51) in accordance with the depression operation of brake pedal 2 (during the pressure increase). In addition, when the brake pedal is returned toward the original released position, the brake liquid is returned from respective wheel cylinders 8 toward master cylinder 5 (first liquid chamber 51) (during the pressure decrease). Specifically, the brake liquid is supplied or exhausted to respective wheel cylinders 8 from first liquid chamber 51 of each system of master cylinder 5 via first oil passage 11 and second oil passage 12. That is to say, the liquid pressure of first liquid chamber 51 (master cylinder liquid pressure) generated in accordance with the operation of brake pedal 2 is supplied to wheel cylinders 8.

It should herein be noted that, if stroke S is shorter than predetermined stroke SO (first state), the pressure of second liquid chamber 52 of master cylinder 5 is substantially the same as the low pressure (the atmospheric pressure) of reservoir 4. Thus, a high pressure is not acted on suction section 70 of pump 7. Thus, the durability of pump 7 (for example, a seal member) can be maintained and improved.

In addition, even if the start of the brake operation is detected, in a predetermined low pressure area, the wheel cylinder liquid pressure is created by means of the first brake liquid pressure apparatus. That is to say, at the initial stage of braking (other than a case where the large deceleration is required), the liquid pressure is not generated by the drive of the pump. Thus, an operation frequency of pump 7 is suppressed and the reduction of the durability of pump 7 and the worsening of a sound vibration performance of device 1 can be suppressed.

It should be noted that, at the braking initial stage such that a large deceleration is not required (in other words, a noise tends to be noticed), the operation frequency of pump 7 is suppressed so that an effect of quietness can be improved.

(Normal (Ordinary) Brake: During Boosting Control)

Device 1 achieves a boosting function by creating the wheel cylinder liquid pressure through the second brake liquid pressure creation device (the second system) in a predetermined high pressure area while the brake operation is carried out. Specifically, ECU 100 drives liquid pressure unit 6 to create the wheel cylinder liquid pressure in a case where, in a state in which the brake operation is carried out, the calculated target wheel cylinder liquid pressure is higher than a predetermined liquid pressure.

In this way, even in a case where the wheel cylinder liquid pressure by means of first brake liquid pressure creation apparatus does not reach to the target wheel cylinder liquid pressure, an insufficient quantity is compensated by liquid pressure unit 6 (boosted). Thus, a desired brake characteristic can be achieved.

In addition, a pump 7 is driven only if the target wheel cylinder liquid pressure is high. Thus, the operation frequency of pump 7 can be suppressed, the improvement of the durability of pump 7 can be achieved, and the worsening of the sound vibration performance can be suppressed.

It should be noted that since pump 7 is operated only when a large deceleration is required (in other words, the noise tends to be difficult to be noticed), the effect of quietness can be improved. Hereinafter, each operation of the pressure increase, the pressure decrease, and a (pressure) hold will herein be explained.

Figure 5:
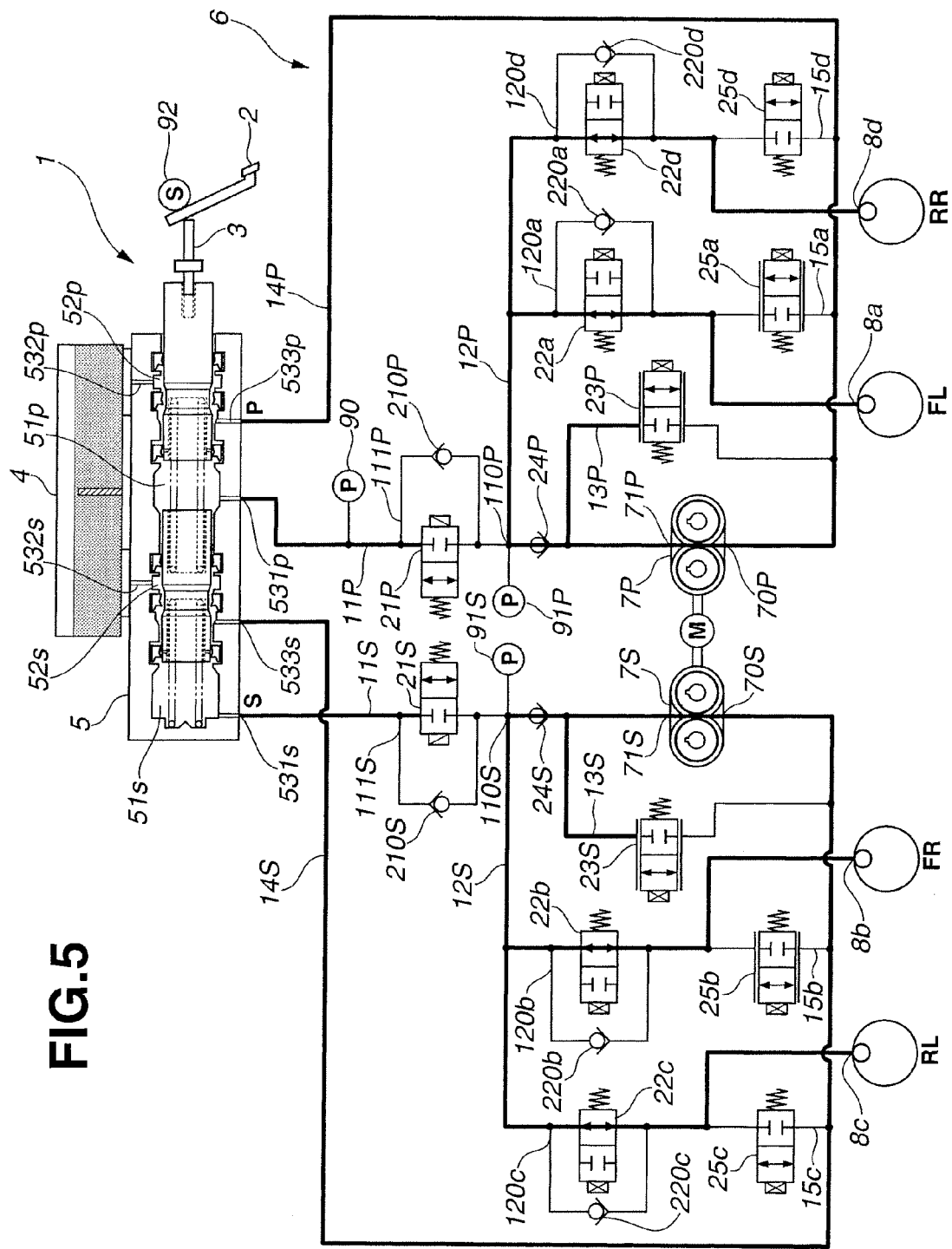
FIG. 5 is a representation of the flow of the brake liquid at a time of an ordinary brake operation (boosting control), a regenerative cooperation control, and a pressure increase control in VDC.

As shown in FIG. 5, pressure increase control section 103 of ECU 100 drives pump 7, controls gate out valve 21 in the valve closure direction, controls pressure increase valve 22 in a valve open direction, and controls pressure decrease valve 25 in a valve closure direction to increase the pressure of wheel cylinder liquid pressure. In this way, an easy control permits the pressure increase control to be carried out. The number of rotations (draining quantity) or so forth of pump 7 is controlled on a basis of the detection value of liquid pressure sensor 91 so that the wheel cylinder liquid pressure is controlled to provide the target liquid pressure.

Since first oil passage 11 is interrupted by means of gate out valve 21, the supply of the brake liquid from first liquid chamber 51 of master cylinder 5 to wheel cylinders 8 is suppressed so that a reaction force of brake pedal 2 is easily secured. In addition, a transmission of the draining pressure of pump 7 to first liquid chamber 51 is suppressed. Thus, such a fact that a vibration on brake pedal 2 is generated so that the driver gives an unpleasant feeling can be suppressed.

Pump 7 sucks the brake liquid within reservoir 4 via second liquid chamber 52 of master cylinder 5 (auxiliary supply port 532, second liquid chamber 52, and suction port 533) and suction oil passage 14 and drains the brake liquid to second oil passage 12.

The brake liquid drained by pump 7 is supplied to respective wheel cylinders 8 via second oil passage 12.

If stroke S is shorter than SO (first state), the brake liquid from reservoir 4 is sucked to pump 7 via second liquid chamber 52 of master cylinder 5 and via suction oil passage 14.

Figure 6:
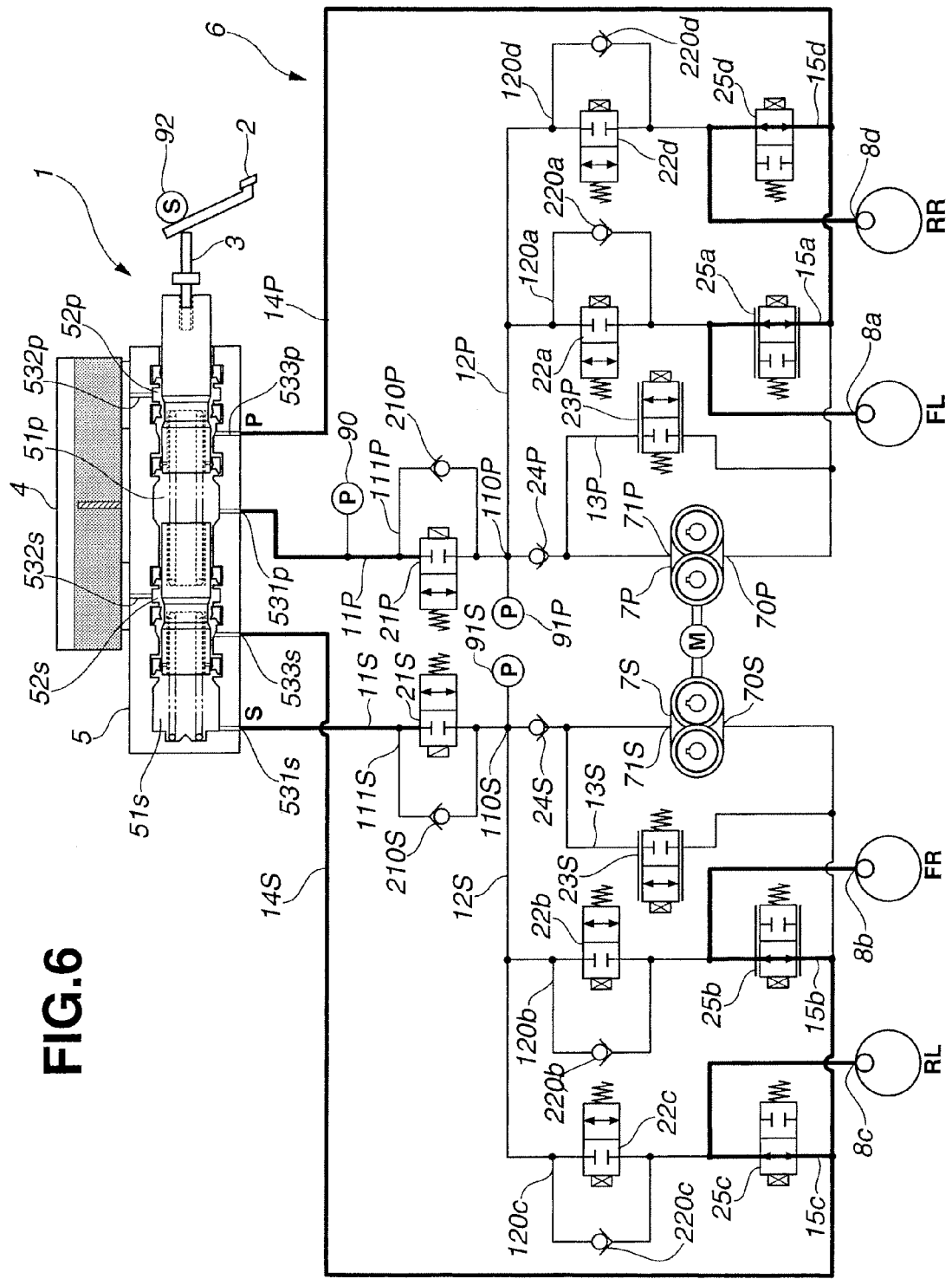
FIG. 6 is a representation of the flow of the brake liquid at a time of an ordinary brake operation (boosting control), the regenerative cooperation control, and a pressure decrease control in VDC.

As shown in FIG. 6, pressure decrease control section 104 of ECU 100 stops pump 7 in a state in which the brake operation is carried out, controls gate out valve 21 in a valve closure direction, controls pressure increase valve 22 in the valve closure direction, and controls pressure decrease valve 25 in the valve open direction so that the wheel cylinder liquid pressure is decreased. In such an easy control as described above, the pressure decrease control can be carried out. By controlling a valve open quantity of pressure decrease valve 25, the wheel cylinder liquid pressure is controlled to provide the target liquid pressure. Since, in the first embodiment, at least one (pressure decrease valves 25a, 25b of front wheels FL, FR) of pressure decrease valves of the respective systems is the proportional control valve, a more precise control is possible so that a smooth pressure decrease control can be achieved. Since first oil passage 11 is interrupted by means of gate out valve 21, the brake liquid pressure supply from first liquid chamber 51 of master cylinder 5 to wheel cylinders 8 is suppressed and a transmission of the liquid pressure of wheel cylinder 8 side to first liquid chamber 51 of master cylinder 5 is suppressed. Thus, such a phenomenon that a vibration on brake pedal 2 is generated so that the driver gives an unpleasant feeling can be prevented from occurring. In addition, the reaction force of brake pedal 2 becomes easy to be secured.

It should be noted that, although the brake liquid from master cylinder 5 side via check valve 210 is flowed out to second oil passage 12, pressure increase valve 22 is closed. Hence, such a situation that the above-described brake liquid is flowed out toward wheel cylinder 8 side is suppressed and such a situation that an unnecessary movement of brake pedal 2 is suppressed.

The brake liquid returned from respective wheel cylinders 8 to second liquid chamber 52 via pressure decrease oil passage 15 and suction oil passage 14 is returned to reservoir 4 via auxiliary supply port 532 if stroke S is shorter than SO (the first state). The communication between suction port 533 and auxiliary supply port 532 is secured and the pressure decrease control can smoothly be carried out by setting predetermined stroke SO to a maximum value that piston 54 strokes in response to the ordinary brake operation of the driver.

Figure 7:
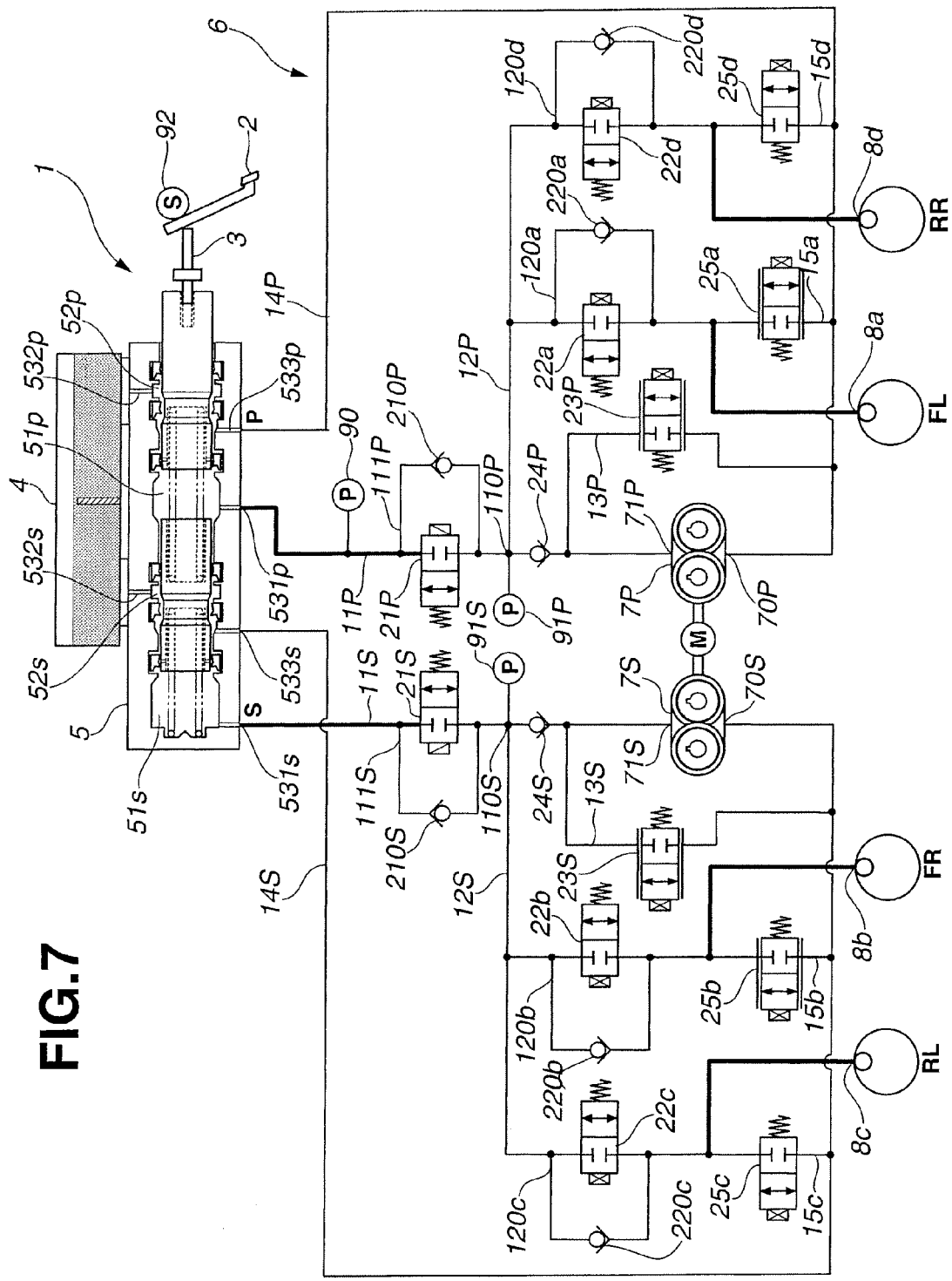
FIG. 7 is a representation of the flow of the brake liquid at a time of an ordinary brake operation (boosting control), regenerative cooperation control, and a pressure holding control in VDC.

As shown in FIG. 7, hold control section 105 of ECU 100 closes gate out valve 21, closes pressure increase valve 22, and turns other actuators in the non operation state in a state in which the brake operation is carried out. In such an easy control as described above, the hold control can be carried out.

Since first oil passage 11 is interrupted by means of gate out valve 21, the supply of the brake liquid from first liquid chamber 51 of master cylinder 5 to wheel cylinders 8 is suppressed and the transmission of the liquid pressure from wheel cylinder 8 side to first liquid chamber 51 is suppressed.

The liquid pressure of each wheel cylinder 8 is not escaped from pressure decrease valve 25 nor pressure increase valve 22 and, thus, is held.

It should be noted that, although the brake liquid is flowed out to first oil passage 11 side from wheel cylinder 8 side via check valve 220, gate out valve 21 is closed. Hence, the flow out of the brake liquid toward master cylinder 5 side is suppressed. The liquid pressure of each wheel cylinder 8 is more assuredly maintained.

It should be noted that pump 7 may be started to be operated while the target wheel cylinder liquid pressure falls in the predetermined low pressure area. In this case, the wheel cylinder liquid pressure is previously pressure increased by means of first brake liquid pressure creation apparatus. Hence, as compared with a case where the wheel cylinder liquid pressure is increased initially only by means of the second brake liquid pressure creation apparatus (liquid pressure unit 6), a delay time up to a rise in the number of rotations of motor M (pump 7) is eliminated and, for example, a pressure increase response characteristic when an abrupt brake is depressed can be improved. For example, the number of rotations of motor M (pump 7) may be controlled in accordance with a variation speed of a depression force or a speed of the stroke. Such an easy control as described above can realize an improvement in the response characteristic.

During the pressure increase control, a circulation valve 23 may be controlled in the valve open direction. In this case, the control of motor M (pump 7) can be simplified, the response characteristic of the liquid pressure control can be improved, and a width of control can be widened. That is to say, part or whole of the brake liquid that pump 7 drains is returned (circulated) to the suction side of pump 7 via third oil passage 13. The brake liquid quantity supplied from pump 7 to second oil passage 12 is determined in accordance with a valve opening quantity of circulation valve 23. The valve opening quantity of circulation valve 23 whose inertia is relatively small is controlled rather than the control of the number of rotations of motor M whose inertia is relatively large. Thus, the wheel cylinder liquid pressure can be controlled with a better response characteristic and in a more precise manner. It should be noted that, since circulation valve 23 is the proportional control valve, the wheel cylinder liquid pressure can be controlled in a more precise manner and the control range can be expanded more widely.

In addition, pump 7 may be operated (continuous drive) not only in the pressure increase control but also in the pressure decrease control or so forth and, during the operation of pump 7, circulation valve 23 may be controlled in the valve opening direction. In this case, the above described action and effect can be obtained. In the pressure decrease control or so forth, the number of rotations of the pump is suppressed to be low. The reduction of the durability of pump 7 and the worsening of the sound vibration characteristic can be suppressed.

In addition, one end of third oil passage 13 may be connected to a downstream side of check valve 24 (for example, second oil passage 12) not to an upstream side of check valve 24 (between drain section 71 of pump 7 and check valve 24). In this case, when the pressure decrease control of wheel cylinder 8 side is carried out, circulation valve 23 (not pressure decrease valve 25) is controlled in the valve open direction so that the brake liquid of wheel cylinder 8 side can be returned to master cylinder 5 side via oil passages 12, 13, 14. In this case, as is different from the first embodiment, pressure decrease valves 25 (25p, 25s) may be on-or-off valves. Since circulation valve 23 is the proportional control valve, circulation valve 23 is used to adjust the pressure decrease quantity so that a precise control of the wheel cylinder liquid pressure can be achieved in the precise manner.

In the first embodiment, one end of third oil passage 13 is connected to the upstream side of check valve 24. Hence, a ripple of the draining pressure of pump 7 can be reduced and a brake operation feeling can be improved. That is to say, in the stopped state of pump 7, a liquid pressure load between pump drain section 71 and check valve 24 becomes relatively small. Therefore, when pump 7 is started and outputs a torque overcoming a stationary frictional force, there is a possibility that pump 7 is vigorously rotated and, accordingly, a ripple at the draining side (a downstream side of check valve 24) is generated so that the sound vibration characteristic is reduced. In addition, there is a possibility that a liquid pressure variation of the pump draining pressure is transmitted to wheel cylinder 8 side.

In addition, when, in a state in which the driver operates brake pedal 2 so that the liquid pressure from master cylinder 5 side is acted on the downstream side of check valve 24, the liquid pressure overcoming this liquid pressure is drained at one time from pump 7, the liquid pressure variation is transmitted to the master cylinder 5 side so that there is a possibility of a reduction of a pedal feeling.

It should be noted that such a problem as described above is remarkable when the ordinary brake operation (during the boosting control or during the regenerative cooperation control) is carried out rather than a relatively strong brake operation is carried out as during a ABS control. Whereas, in the first embodiment, by connecting one end of third oil passage 13 to the upstream side of check valve 24, an abrupt rise in liquid pressure (at the downstream side of check valve 24) during the pump start can be suppressed and the above-described problem can be solved.

It should be noted that ECU 100 may control an open-or-closure (power supply quantity) of gate out valve 21 so that a difference between the liquid pressure of master cylinder 5 side (the detection value of liquid pressure sensor 90) and the liquid pressure at the pump draining side (the detection value of liquid pressure sensor 91) becomes a desired value when the wheel cylinder liquid pressure is generated by means of second brake liquid pressure creation apparatus (second system). Thus, the liquid pressure of master cylinder 5 side is controlled to secure the stroke and reaction force of piston 54. Consequently, the operation feeling of brake pedal 2 can be improved.

(Regenerative Cooperation Control)

In a state in which the brake operation is carried out, a regenerative braking apparatus is operated. At this time, device 1 executes the regenerative cooperation control by creating the wheel cylinder liquid pressure through the second brake liquid pressure creation apparatus (second system). Specifically, ECU 100 calculates a target wheel cylinder liquid pressure at the time of regenerative cooperation control on a basis of a driver's demanded braking force (the target wheel cylinder liquid pressure at the time of the ordinary brake) calculated from the detected brake operation state and a value of the regenerative braking force and drives liquid pressure unit 6 to realize this target wheel cylinder liquid pressure.

For example, when pressure decrease control section 104 generates the wheel cylinder liquid pressure through the first or second brake liquid pressure creation apparatus (during the ordinary brake), the wheel cylinder liquid pressure is decreased in association with the increase of the regenerative braking force by means of the regenerative braking apparatus. A specific operation of liquid pressure unit 6 during each control of the pressure decrease, the pressure increase, and hold is the same as the ordinary brake (achievement of the boosting function) described above.

(VDC)

In a state in which the brake operation is carried out or in which the brake operation is not carried out, device 1 executes the VDC control by creating the wheel cylinder liquid pressure by means of the second brake liquid pressure apparatus (the second system). Specifically, ECU 100 drives liquid pressure unit 6 to realize the calculated target wheel cylinder liquid pressure. A specific operation of liquid pressure unit 6 during each control of the pressure decrease, the pressure increase, and the hold is the same as the ordinary brake (during the achievement of the boosting function) described above.

In VDC, the wheel cylinder liquid pressure for the road wheel to be controlled is separately pressure increase enabled by controlling the open-or-closure of each pressure increase valve 22 and the wheel cylinder liquid pressure of the road wheel to be controlled is separately pressure decrease enabled by controlling the open-or-closure of each pressure decrease valve 25.

It should be noted that circulation valve 23 may be controlled in the valve open direction during the regenerative cooperation control or VDC control in the same way as the ordinary brake (during the achievement of the boosting function) described above. In addition, pump 7 may, at all times, be operated. In this case, the same action and advantages are obtained.

(ABS)

When a lock of a road wheel or the road wheels is detected in the state in which the brake operation is carried out, device 1 executes the ABS control by creating the wheel cylinder liquid pressure through the second brake liquid pressure creation apparatus (second system). Specifically, ECU 100 repeats the pressure decrease, the pressure hold, and the pressure increase of the wheel cylinder liquid pressure to drive liquid pressure unit 6 so as to fall a slip rate of road wheels within a predetermined range. It should be noted that a target wheel cylinder liquid pressure may be set and the ABS control may be carried out so as to make the wheel cylinder liquid pressure equal to this target wheel cylinder liquid pressure.

Each operation of the pressure decrease, the holding, and the pressure increase will be described below.

Figure 8:
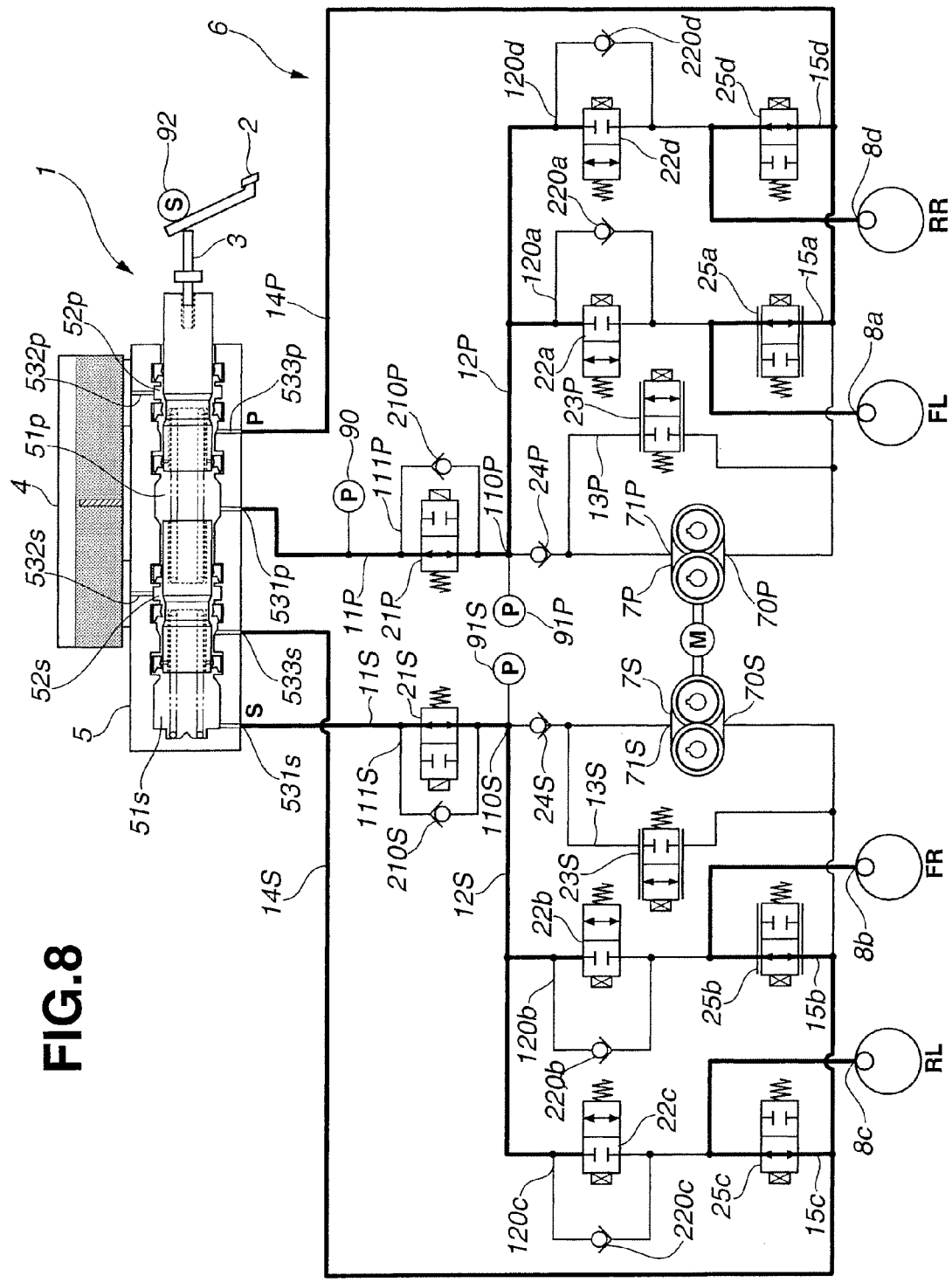
FIG. 8 is a representation of the flow of the brake liquid in the liquid pressure circuit of the brake device in the first embodiment in a pressure decrease control of an ABS.

As shown in FIG. 8, pressure decrease control section 104 of ECU 100 stops pump 7, opens gate out valve 21, closes pressure increase valve 22, and controls pressure decrease valve 25 in the valve open direction, in the state in which the brake operation is carried out. Thus, the master cylinder liquid pressure is decreased. Since second oil passage 12 is interrupted by means of pressure increase valve 22, the brake liquid is not supplied to wheel cylinder(s) 8 from first liquid chamber 51 of master cylinder 5. The brake liquid returned from each wheel cylinder 8 to second liquid chamber 52 via pressure decrease oil passage 15 and suction oil passage 14 is returned to reservoir 4 via auxiliary supply port 532 if piston stroke S is shorter than SO (first state).

The communication between suction port 533 and auxiliary supply port 532 is secured and the pressure decrease control can smoothly be carried out by setting predetermined stroke SO to a maximum value that piston 54 strokes in response to the ordinary brake operation by the driver.

Figure 9:
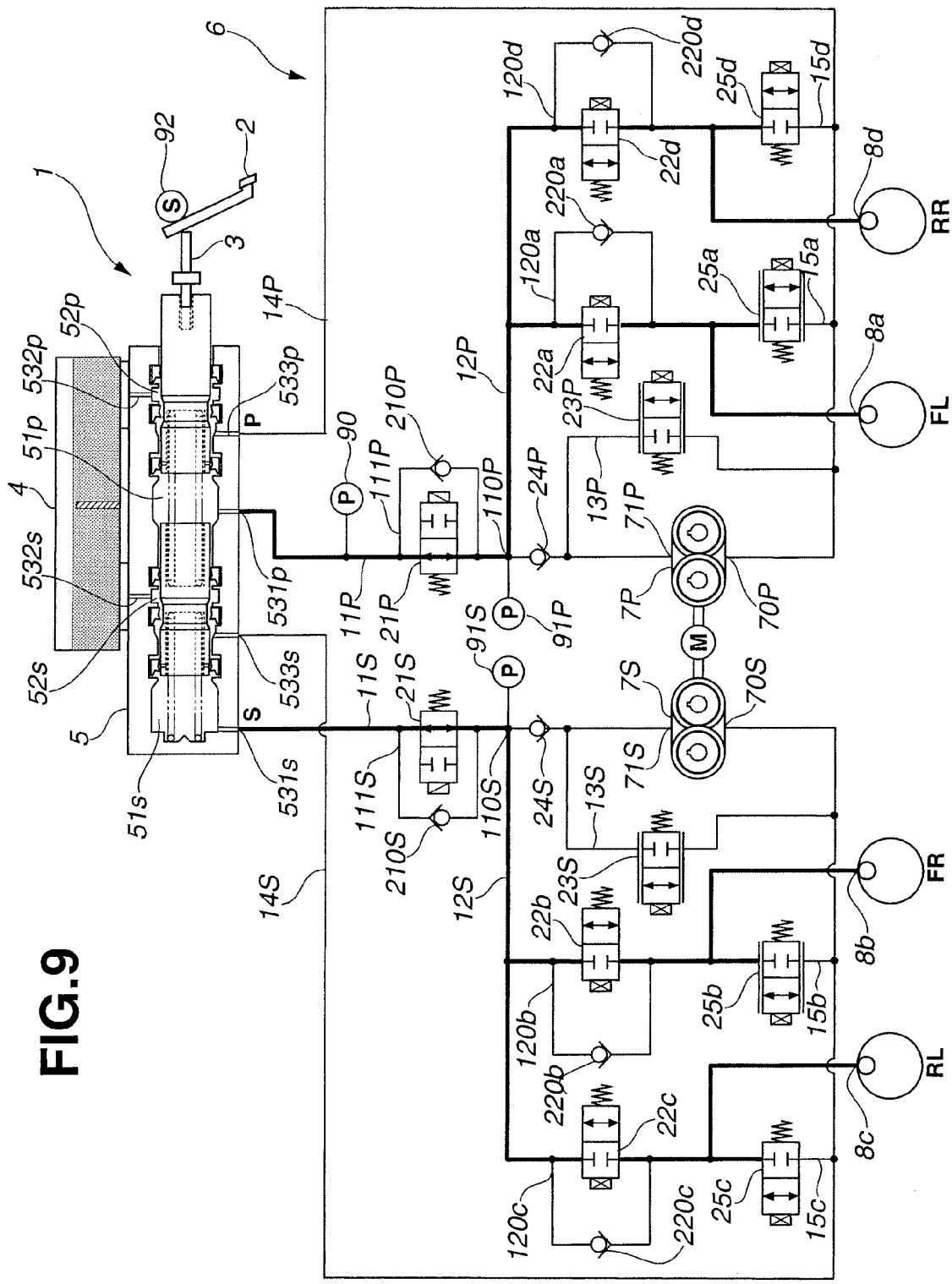
FIG. 9 is a representation of the flow of the brake liquid in the liquid pressure circuit of the brake device in the first embodiment in a pressure holding control of the ABS.

As shown in FIG. 9, hold control section 105 of ECU 100 closes pressure increase valve 22 in a state in which the brake operation is carried out and turns the other actuators in the non-operation state.

Since second oil passage 12 is interrupted by means of pressure increase valve 22, the brake liquid is not supplied from first liquid chamber 51 of master cylinder 5 to wheel cylinders 8. In addition, since the liquid pressure of each wheel cylinder 8 is not escaped from pressure decrease valve 25 nor pressure increase valve 22, the liquid pressure of each wheel cylinder 8 is in the hold state.

Figure 10:
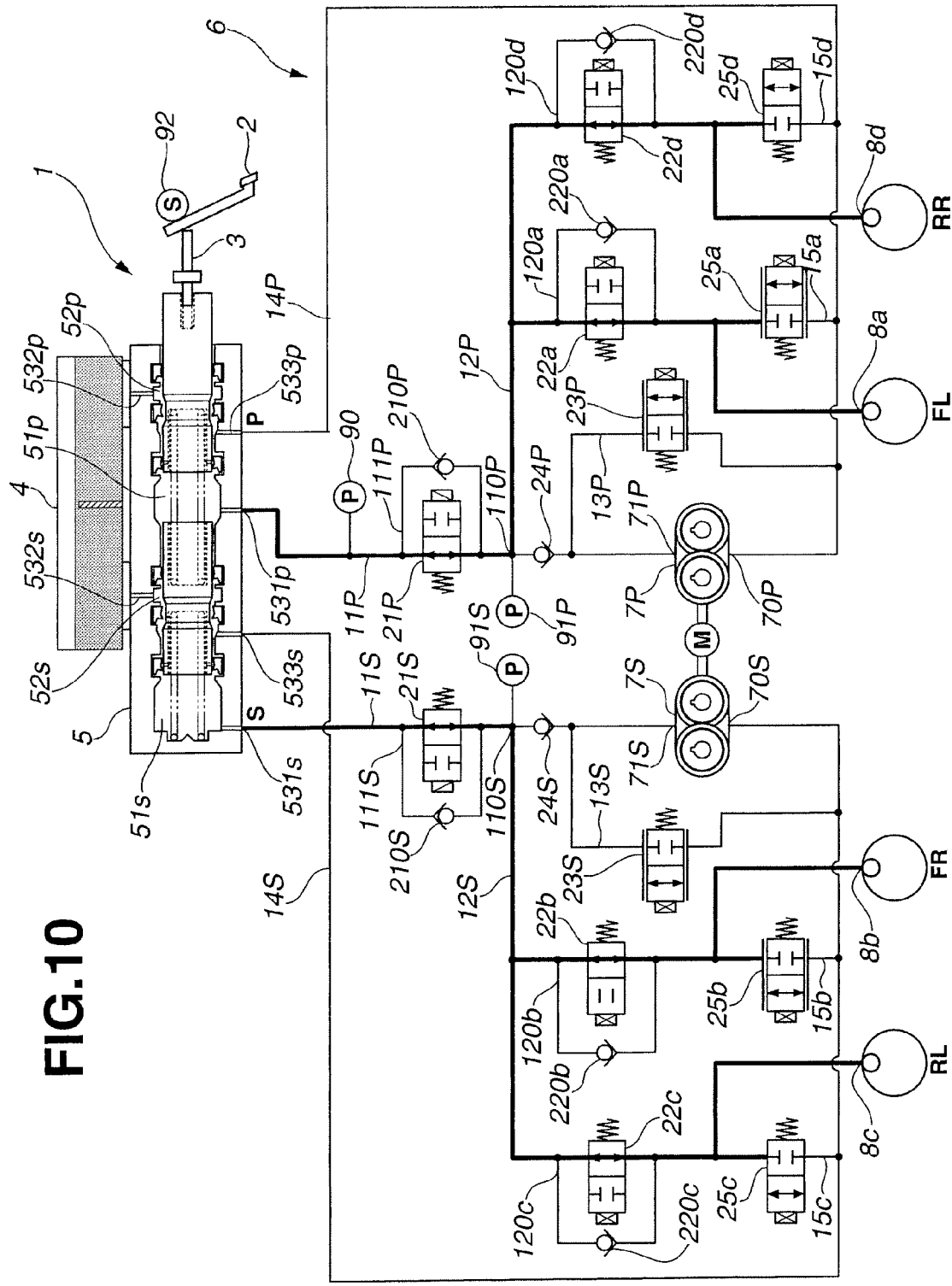
FIG. 10 is a representation of the flow of the brake liquid in the liquid pressure circuit of the brake device in a pressure increase control of the ABS.

As shown in FIG. 10, a pressure increase control section 103 of ECU 100 turns pump 7 and each valve in a non-operation state (in the same way as the ordinary brake at the time of the initial depression). In spite of a magnitude of stroke S (whether stroke S is equal to or longer than predetermined stroke SO), namely, even in the first state or in the second state, the brake liquid pressure is supplied to each wheel cylinder 8 from first liquid chamber 51 of master cylinder 5 via first oil passage 11 and second oil passage 12.

In the case of ABS, the valve open or closure of pressure increase valve 22 and pressure decrease valve 25 is separately controlled and the wheel cylinder liquid pressure for one of road wheels to be controlled is separately enabled to be the pressure decrease, the pressure increase, and the hold.

Each control of the boosting, the regenerative cooperation, VDC, and ABS by means of the second system (pump 7) as described above is carried out in a range in which the driver ordinarily carries out the brake operation. Therefore, in the same way as the ordinary brake during an initial depression (boosting non-operation), stroke S is shorter than SO (first state), suction port 533 and auxiliary supply port 532 are communicated. Hence, the pressure of second liquid chamber 52 is substantially the same as the low pressure (the atmospheric pressure) of reservoir 4. Thus, high pressure is not acted upon suction section 70 of pump 7. Hence, the durability of pump 7 can be maintained and can be improved.

(At a Time of Failure)

When the second brake liquid pressure creation apparatus (liquid pressure unit 6) fails, first brake liquid pressure creation apparatus, namely, the ordinary brake (boosting function non-achievement state) creates the wheel cylinder liquid pressure. Hereinafter, a case where pressure decrease valve 25 is stuck in the open state will be exemplified. For example, in a case where first pressure decrease valve 25a of front left road wheel FL is in an open failure and is not closed (remains open), the brake liquid in the p system including wheel cylinder 8a of this front left road wheel FL is flowed out to low pressure suction oil passage 14p via first pressure decrease oil passage 15a. Therefore, there is a possibility of becoming difficult to increase the liquid pressure of wheel cylinder 8 side in this p system even if switched to the first brake liquid pressure creation apparatus.

Whereas, in device 1, at the time of the above-described failure, the brake liquid supplied from first liquid chamber 51 of master cylinder 5 toward wheel cylinders 8 is flowed out in suction oil passage 14p. Thus, piston 54p of master cylinder 5 is drawn into first liquid chamber 51. Hence, the depression quantity of brake pedal 2 by the driver (stroke) becomes larger than the ordinary quantity and, as shown in FIG. 3, piston 54 strokes by SO or longer in the x axis positive direction side. Thus, the state is in the second state and the communication between auxiliary supply port 532 and suction port 533 in second liquid chamber 52 is interrupted. Specifically, the flow of the brake liquid from suction port 533 (suction oil passage 14p side) to auxiliary supply port 532 (reservoir 4 side) is suppressed. Thus, when stroke S is equal to or larger than SO after the switch to the first brake liquid pressure creation apparatus (state of FIG. 4), the communication between suction oil passage 14p and reservoir 4 is interrupted. Thus, the flow out of the brake liquid within wheel cylinder 8 side in the p system from suction oil passage 14p to reservoir 4 is suppressed. On the other hand, the master cylinder liquid pressure in accordance with the operation of brake pedal 2 is supplied from first liquid chamber 51 of master cylinder 5 to each wheel cylinder 8. Thus, the liquid pressure of each wheel cylinder 8 in the p system including wheel cylinder 8a is created. In this way, even in a case where first pressure decrease valve 25a is stuck to the open direction, the same state when first pressure decrease valve 25a is in the valve closure state occurs if stroke S is equal to or longer than SO, namely, the state in which suction oil passage 14p is not communicated with reservoir 4 (the atmospheric pressure). Thus, the p system failure does not occur and the ordinary brake can be maintained.

It should be noted that, during the above-described failure, the liquid pressure within suction oil passage 14p becomes substantially equal to the liquid pressure within first oil passage (master cylinder liquid pressure). In other words, a high pressure equal to or higher than the master cylinder liquid pressure is not acted upon suction section 70 of pump 7 and a liquid pressure difference between suction side and draining side of pump 7 is small. Hence, the durability of pump 7 (seal member or so forth) can be maintained or improved. When another position of liquid pressure unit 6 fails, the similar mechanism can maintain the ordinary brake.

(Action and Effect in a Comparison with a Comparative Example)

Figure 11:
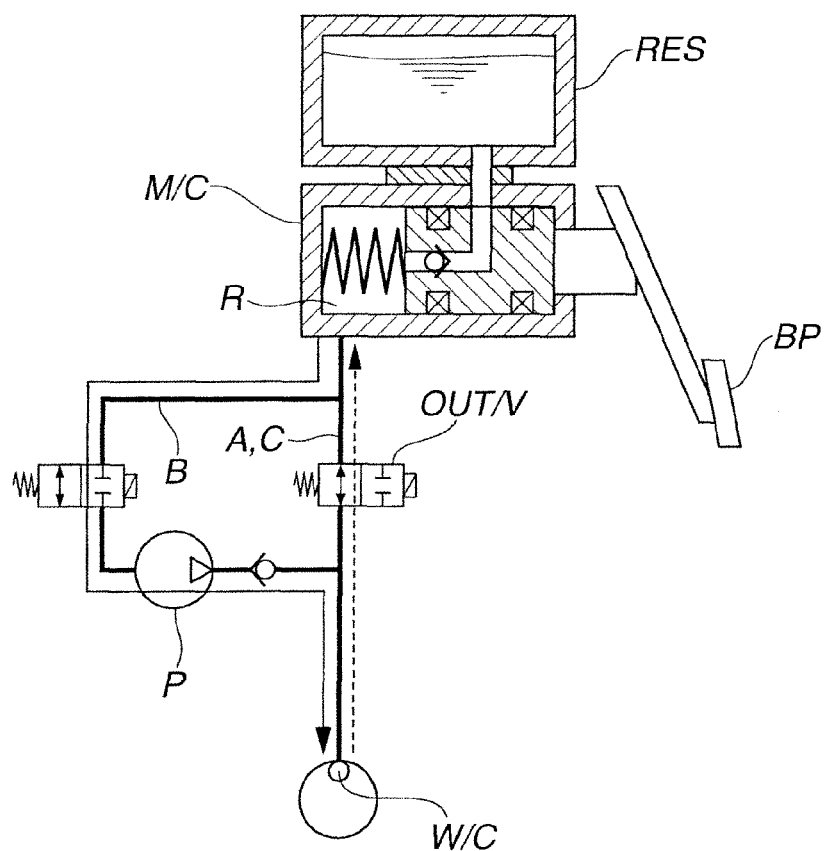
FIG. 11 is a diagrammatical view of a rough configuration of a brake device in a comparative example 1 together with the liquid pressure circuit.
Figure 12:
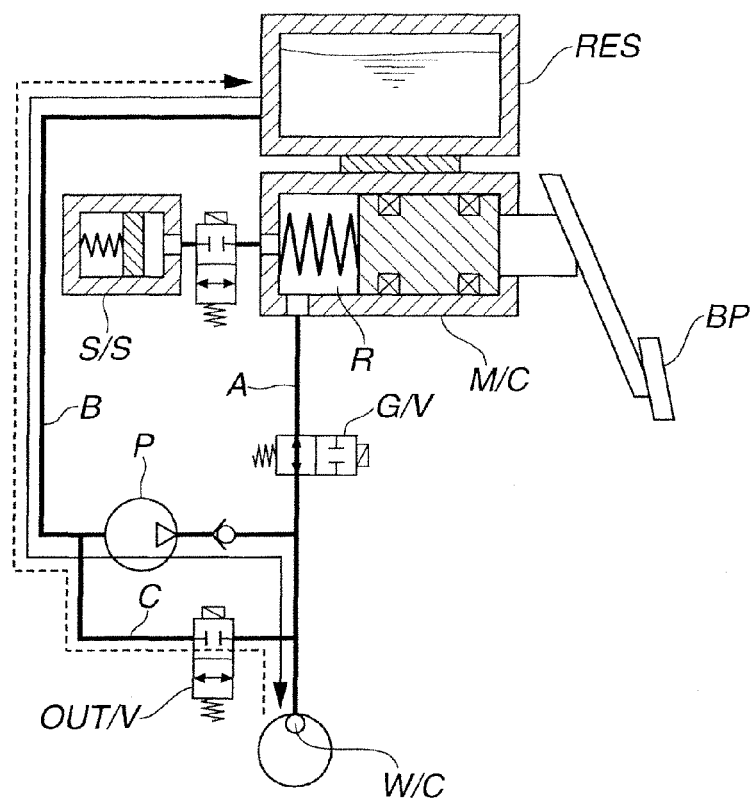
FIG. 12 is a diagrammatical view of a rough configuration of a brake device in a comparative example 2 together with the liquid pressure circuit.
Figure 13:
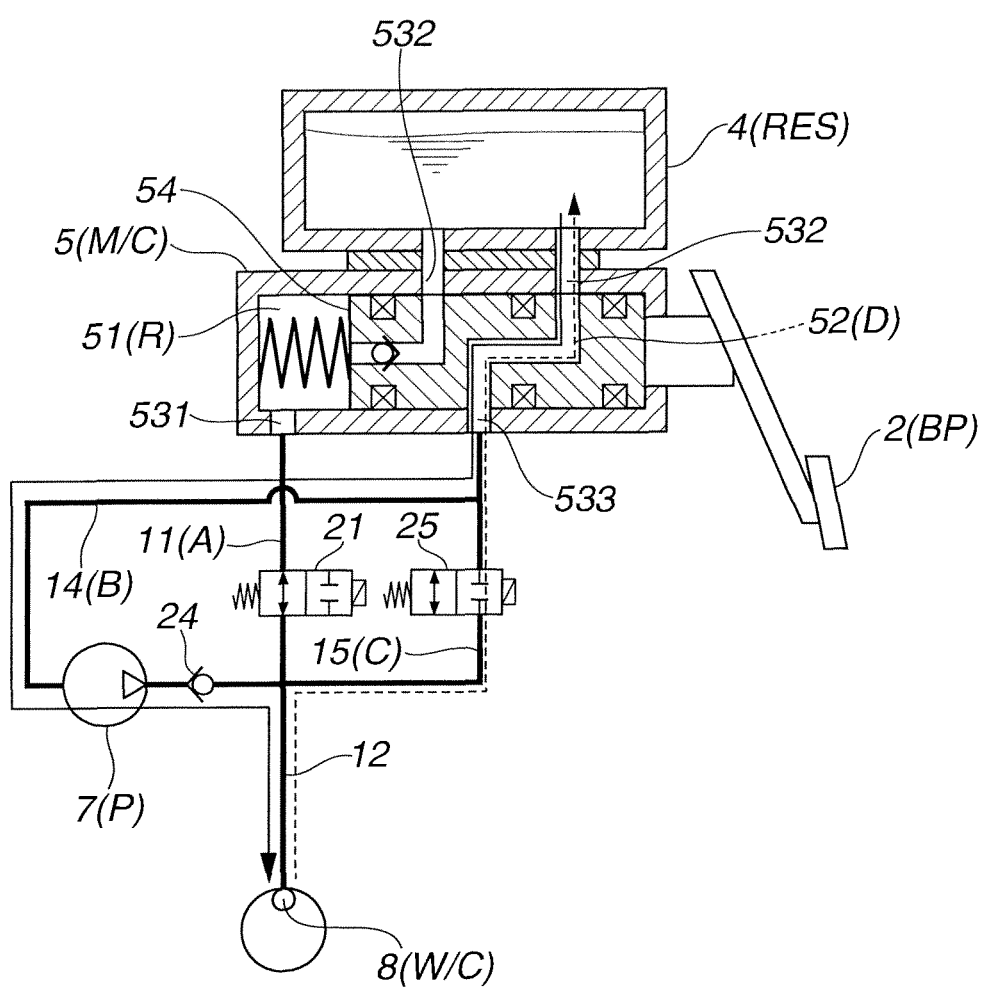
FIG. 13 is a diagrammatical view of a rough configuration of a brake device in the first embodiment together with the liquid pressure circuit.

FIGS. 11 through 13 are diagrammatic views of modeling a circuit structure of various types of brake devices, FIG. 11 representing a comparative example 1, FIG. 12 representing a comparative example 2, and FIG. 13 representing the first embodiment. A solid line with an arrow mark denotes the flow of the brake liquid at the time of the pressure increase and a broken line with the arrow mark denotes the flow of the brake liquid at the time of the pressure decrease. Hereinafter, an oil passage through which the brake liquid is supplied from a pressure chamber R of master cylinder M/C to wheel cylinder W/C in accordance with the brake operation and which enables the pressure increase of wheel cylinder W/C is an oil passage A, an oil passage which is enabled to supply the brake liquid from reservoir RES as a brake liquid source to pump P as a liquid pressure generation source is an oil passage B, and an oil passage through which the brake liquid is returned from wheel cylinder W/C to reservoir RES and is enabled to decrease wheel cylinder W/C is an oil passage C.

The brake system (oil passage A) with master cylinder M/C as the liquid pressure source constitutes the first system and the brake system (oil passage B) with pump P as the liquid pressure source constitutes the second system.

In comparative example 1, oil passage A and oil passages B and C are not divided.

Specifically, oil passage A and oil passages B, C are connected to a pressure chamber R of master cylinder M/C. Oil passage C is a common oil passage to oil passage A and connected to pressure chamber R of master cylinder M/C. Hence, during the pressure increase and during the pressure decrease of wheel cylinder W/C, the brake liquid goes in and out from the same pressure chamber R.

In comparative example 2, oil passages B and C are connected to reservoir RES not via pressure chamber R of master cylinder M/C. The circuit of oil passage C is partially common to oil passage B. A shut-off valve G/V is provided in oil passage A and a stroke simulator S/S is provided in master cylinder M/C. In a state in which shut-off valve G/V is closed so that the communication between master cylinder M/C and wheel cylinder W/C is interrupted, pump P is operated and pump P serves to pressure increase wheel cylinder W/C. In addition, stroke simulator S/S generates the reaction force in accordance with the brake operation.

The circuit structure of device 1 in the first embodiment is basically the same as comparative example 2. As is different from comparative example 2, the first embodiment is not provided with stroke simulator S/S. In addition, oil passages B, C (oil passages 14, 15) are connected to reservoir 4 passing through a communication passage D (second liquid chamber 52) provided in the inside of master cylinder 5 and this communication passage D (second liquid chamber 52) is communicated or interrupted in accordance with the stroke of master cylinder piston 54.

Comparative example 1 has a relatively simple circuit structure. During the failure of the second system with pump P as the liquid pressure source, the brake liquid is trapped between pressure chamber R of master cylinder M/C and wheel cylinder W/C. Since wheel cylinder W/C can be pressure increased or pressure decreased in accordance with the brake operation, such a merit that a reliability is high is provided in comparative example 1.

On the other hand, since the brake liquid goes in and out from the same pressure chamber R of master cylinder M/C during the wheel cylinder liquid pressure increase and the wheel cylinder liquid pressure decrease, a brake pedal feeling becomes easy to be worsened and there is a demerit such that a compatibility between the brake control through the second system (for example, a highly efficient regenerative brake control) and a favorable brake operation feeling is difficult. Since, in comparative example 2, oil passages B, C are connected to reservoir RES not via pressure chamber R of master cylinder M/C, while the demerit of comparative example 1 is eliminated, pump P and each valve are, at all times, controlled so that an arbitrary wheel cylinder liquid pressure can be obtained. On the other hand, since, during the failure in the second system, the brake liquid is not trapped between pressure chamber R and wheel cylinder W/C (so called an open circuit), there is a demerit such that the reliability is lower than comparative example 1. For example, if pressure decrease valve OUT/V in oil passage C has failed in the open state, the brake liquid in master cylinder M/C is reversely caused to flow into reservoir RES. If a fail safe mechanism is added in order to prevent this reverse flow of the brake liquid, the structure becomes complicated.

On the other hand, in device 1 of the first embodiment, oil passages B, C (oil passages 14, 15) are connected to reservoir 4 not via pressure chamber R (first liquid chamber 51) in the same way as comparative example 2. Thus, while the demerit of comparative example 1 is eliminated, pump 7 and each valve are controlled so that an arbitrary wheel cylinder liquid pressure can be obtained. That is to say, since the systems (oil passage A and oil passages of B, C) are divided for the first and second brake liquid pressure creation apparatuses, a controllability cam be improved. For example, when the regenerative braking apparatus is operated, the second system (second brake liquid pressure creation apparatus) creates the wheel cylinder liquid pressure in accordance with the regenerative braking force. Thus, in the same way as comparative example 2, the second system can control the braking in the same way as a brake-by-wire BBW. Thus, a highly efficient regenerative braking control can be achieved. At this time, since the brake liquid does not go in and out from same pressure chamber R (first liquid chamber 51) of master cylinder 5, a worsening of a pedal feel as comparative example 1 can be suppressed. It should be noted that, in the same way as comparative example 2, in device 1, a stroke simulator may be installed (in place of elastic member 30).

On the other hand, if the second system (second brake liquid pressure creation apparatus) fails, a communication passage (second liquid chamber 52) is interrupted in accordance with the stroke of master cylinder piston 54. Thus, in the same way as comparative example 1, the brake liquid is trapped (so called, close circuit) between pressure chamber R (first liquid chamber 51) and wheel cylinders 8, the reliability is high. For example, even if pressure decrease valve 25 of oil passage C (oil passage 15) fails to open, the brake liquid of master cylinder 5 does not cause the reverse flow of the brake liquid to reservoir 4. Consequently, the demerit of comparative example 2 can be eliminated.

Specifically, the second brake liquid pressure creation apparatus includes: pump 7; gate out valve 21 disposed in first oil passage 11 connecting drain section 71 of pump 7 and drain port 531; second oil passage 12 branched between pump suction section 71 and gate out valve 21 and connected to wheel cylinder 8; pressure increase valve 22 disposed in second oil passage 12; suction oil passage 14 connecting suction port 533 and pump suction section 70; pressure decrease oil passage 15 connecting second oil passage 12 and suction oil passage 14; and pressure decrease valve 25 disposed in pressure decrease oil passage 15.

In this way, the second brake liquid pressure creation apparatus can be constituted by modifying existing system to a small degree. For example, if gate out valve 21 is interrupted, the system of oil passages can be divided for each of the first and second brake liquid pressure creation apparatuses. Thus, a small sizing and a low cost of device 1 can be achieved. In addition, the second brake liquid pressure creation apparatus is provided with suction oil passage directly connecting suction port 533 of master cylinder 5 and suction section 70 of pump 7.

In this way, since suction port 533 and the low pressure side (suction section 70) of pump 7 are directly connected to each other not via an internal reservoir (a volume chamber or brake liquid accumulating chamber installed within a housing of the liquid pressure unit). Hence, a suppression of a large sizing of device 1 (liquid pressure unit 6) and an improvement of parts layout can be achieved. In addition, a reduction in a suction resistance of pump 7 can be achieved.

(Action and Effect as Compared with a Prior Art)

As a modification example of comparative example 2, conventionally, a volume chamber (a stroke simulator chamber) of stroke simulator S/S integral with master cylinder M/C is formed and this stroke simulator chamber is communicated with reservoir RES and oil passages B, C (For example, patent document 1).

This prior art interrupts the communication between the stroke simulator chamber and reservoir RES in order to prevent a lost stroke from being generated due to the liquid quantity escape of the brake liquid from the stroke simulator chamber when the second system with pump P as the liquid pressure source fails and the second system is switched to the first system with the master cylinder M/C as the liquid pressure source.

However, this prior art cannot generate the liquid pressure in pressure chamber R of master cylinder M/C if the communication between the stroke simulator chamber and reservoir RES is interrupted.

When the above-described communication is interrupted and the wheel cylinder W/C is pressure increased by means of the first system with master cylinder M/C as the liquid pressure source, the liquid pressure (equal to the master cylinder pressure) is generated in the stroke simulator chamber. Hence, high pressure is acted upon the suction side of pump 7 via oil passage B so that there is a possibility of the reduction of the durability of pump P.

Whereas, device 1 in the first embodiment can generate the liquid pressure in pressure chamber R (first liquid chamber 51) of master cylinder 5 even when the communication between communication passage D of the inside of the master cylinder (second liquid chamber 52) and reservoir 4 is not interrupted. When wheel cylinder 8 is pressure increased by means of the first system (first brake liquid pressure creation apparatus) with master cylinder 5 as the liquid pressure source, the liquid pressure (equal to the master cylinder liquid pressure) is not generated on communication passage D (second liquid chamber 52). Hence, no high pressure is acted upon the suction side of pump 7 via oil passage B (oil passage 14). Hence, the reduction of the durability of pump 7 can be suppressed. That is to say, when the first brake liquid pressure creation apparatus is used in a state in which the stroke is shorter than predetermined stroke SO (first state), auxiliary supply port 532 of second liquid chamber 52 and suction port 533 are communicated. Hence, the liquid pressure of second liquid chamber 52 does not become high and high liquid pressure is not acted upon suction section 70 of pump 7. Thus, the durability of pump 7 can be maintained and improved.

It should be noted that, in the first embodiment, two second liquid chambers 52 (suction ports 533) are installed in accordance with respective pistons 54p, 54s. Only one second liquid chamber 52 (suction port 533) (for example, only piston 54p) may be disposed. Each pump 7p, 7s may suck the brake liquid from this second liquid chamber 52 (suction port 533).

Specifically, master cylinder 5 of device 1 includes a third piston seal 553, as a piston seal 55 which seals between an inner peripheral surface of cylinder main body 53 and an outer peripheral surface of piston 54.

Third piston seal 553 is disposed between first piston seal 551 and second piston seal 552 to interrupt auxiliary supply port 532 and suction port 533 when piston 54 strokes by a distance equal to or longer than predetermined stroke SO (interrupts the flow of the brake liquid from suction port 533 toward auxiliary supply port 532) and to communicate between auxiliary supply port 532 and suction port 533 when piston 54 stroke by the distance shorter than predetermined stroke SO.

In this way, according to a simple mechanical structure such that each piston seal 55 is disposed for each port 532, 533 in the master cylinder, while the wheel cylinder liquid pressure is pressure increased or decreased by means of the first system when the stroke is shorter than predetermined stroke SO, auxiliary supply port 532 and suction port 533 are communicated to maintain and improve the durability of pump 7. Thus, the above-described action and effect can be obtained.

More specifically, respective piston seals 55 are disposed within annular grooves 534 through 536 formed on an inner peripheral wall of cylinder main body 53. Each piston 54 includes: a first large diameter section 541 on which a first piston seal 551 is slidably contacted; a second large diameter section 542 on which a second piston seal 552 is slidably contacted; and a small diameter section 543 formed between first large diameter section 541 and second large diameter section 542. A third piston seal 553 is disposed between auxiliary supply port 532 and suction port 533 at a position surrounding small diameter section 543 when the stroke is shorter than predetermined stroke SO and slidably contacted on second large diameter section 542 when the stroke is equal to or longer than predetermined stroke SO.

In this way, according to such a simple mechanical structure that large diameter sections 541, 542 and small diameter section 543 are installed on piston 54 and respective piston seals 55 are disposed for respective parts 541, 542, 543 of piston 54, the above-described action and effect can be obtained such that, when piston 54 strokes equal to or longer than predetermined stroke SO, auxiliary supply port 532 and suction port 533 are interrupted and, when the piston stroke is shorter than predetermined stroke SO, both ports 532, 533 are communicated.

It should be noted that a groove housing piston seal 55 is disposed at piston 54 side not at cylinder main body 53 side, the positional relationship between piston seal 55 sliding integrally with piston 54 and auxiliary supply port 532 and suction port 533 are adjusted so that the communication and interruption of auxiliary supply port 532 and suction port 533 may be controlled in accordance with the stroke of piston 54. In this case, a different diameter section is installed on cylinder main body 53 side to adjust a sliding range of piston seal 55.

Furthermore, each piston seal 55 is a cup seal allowing the flow of brake liquid in an uni-direction. That is to say, first piston seal 551 is disposed in a direction of allowing only the flow of the brake liquid to first liquid chamber 51, third piston seal 553 is disposed in a direction allowing only the flow from auxiliary supply port 532 to suction port 533, and second piston seal 552 is disposed in a direction suppressing the flow of oil from second liquid chamber 52.

Thus, according to the simple mechanical structure such that piston seal 55 has an anisotropy (is the cup seal), the flow of the brake liquid in master cylinder 5 can be controlled. In addition, as second and third piston seals 552, 553 constituting second liquid chamber 52, seal members that have conventionally been used can be used (cup seals which are the same as first piston seal 551). Thus, the cost can be reduced.

Effect of the First Embodiment

Hereinafter, effects that brake device 1 in the first embodiment exhibits are listed.

(1) A brake device comprises:

a brake operation state detecting section 101 configured to detect an operation state of a brake operation member (brake pedal 2) by a driver;

a pump 7 creating a wheel cylinder liquid pressure on a basis of the brake operation state detected by the brake operation state detecting section 101;

a bottomed cylindrical cylinder main body 53 having a first liquid chamber 51, in which a drain port 531 connected to wheel cylinders 8 is equipped, generating a liquid pressure in response to the brake operation by the driver and a second liquid chamber 52 in which a suction port 533 connected to a suction section 70 of pump 7 and an auxiliary supply port 532 communicated with a reservoir 4 are equipped;

a piston 54 slidably inserted through an inner peripheral surface of cylinder main body 53 and interlinked with the brake operation member;

a master cylinder 5 in which a first piston seal 551 sealing between an inner peripheral surface of cylinder main body 53 and an outer peripheral surface of piston 54 to define first liquid chamber 51, a second piston seal 552 to define second liquid chamber 52 together with first piston seal 551, and a third piston seal 553, interposed between first piston seal 551 and second piston seal 552, sealing between the inner peripheral surface of cylinder main body 53 and the outer peripheral surface of piston 54, and interrupting auxiliary supply port 532 and suction port 533 when piston 54 strokes by a distance equal to or longer than a predetermined stroke SO are equipped;

a first brake liquid pressure creation apparatus creating the wheel cylinder liquid pressure through the liquid pressure of first liquid chamber 51 in a first state in which the auxiliary supply port and the suction port are communicated and in a second state in which auxiliary supply port 532 and suction port 533 are interrupted when the piston strokes by the distance equal to or longer than predetermined stroke SO; and a second brake liquid pressure creation apparatus creating the wheel cylinder liquid pressure by sucking the brake liquid within reservoir 4 through pump 7 via auxiliary supply port 532, second liquid chamber 52, and suction port 533.

Thus, when the first brake liquid pressure creation apparatus is used in the state in which the piston stroke is equal to or shorter than predetermined stroke SO, auxiliary supply port 532 of second liquid chamber 52 and suction port 533 are communicated. The liquid pressure of second liquid chamber 52 does not become high and no high pressure is acted upon pump 7. Hence, the reduction of the durability can be suppressed.

(2) When a start of the brake operation is detected by brake operation state detecting section 101, the wheel cylinder liquid pressure is created by the first brake liquid pressure creation apparatus.

Thus, at an initial stage of the braking, the liquid pressure is not generated by driving the pump. Hence, an operation frequency of pump 7 can be reduced. Consequently, the reduction of the durability of pump 7 and the worsening of the sound vibration performance of device 1 can be suppressed.

(3) The brake device further comprises a target wheel cylinder liquid pressure calculating section 102 configured to calculate a target wheel cylinder liquid pressure on a basis of the brake operation state detected by the brake operation state detecting section and the second brake liquid pressure creation apparatus creates the wheel cylinder liquid pressure in a case where the calculated target wheel cylinder liquid pressure is higher than a predetermined liquid pressure.

Thus, pump 7 is driven only when the target wheel cylinder liquid pressure is high. Consequently, the operation frequency of pump 7 is suppressed and the reduction of the durability of pump 7 can be suppressed.

(4) The second brake liquid pressure creation apparatus includes: pump 7; gate out valve 21 disposed in first oil passage 11 connecting drain section 71 of pump 7 and drain port 531; second oil passage 12 branched from a part of first oil passage 11 between drain section 71 of pump 7 and gate out valve 21 and connected to wheel cylinders 8; pressure increase valve 22 disposed in second oil passage 12; suction oil passage 14 connecting suction port 533 and suction section 70 of pump 7; pressure decrease oil passage 15 connecting second oil passage 12 and suction oil passage 14; and pressure decrease valve 25 disposed in pressure decrease oil passage 15.

Thus, the second brake liquid pressure creation apparatus can be provided by a minor modification from the existing system and the low cost and the small sizing of the brake device can be achieved.

Other Embodiments

Hereinabove, the present invention has been described on a basis of the first embodiment. However, a specific structure is not limited to the first embodiment and design modifications in a range which is not departed from a gist of the present invention may be included in the present invention. For example, each liquid pressure control (operations of valves) using liquid pressure unit 6 is not limited to the first embodiment.

In addition, liquid pressure unit 6 may generate the wheel cylinder liquid pressure by means of the pump which is independently of the brake operation by the driver and its form is not limited to the embodiment described above. For example, circulation valve 23 may be omitted. Pump 7 may be driven by means of a separate motor in each system. In addition, pump 7 may not be disposed in each system but a single pump may commonly be used in both systems. In addition, pump 7 may not an external gear type but may be an internal gear type. In addition, pump may not be the gear type but may be, for example, a plunger pump.

The brake operation member which receives the input of the brake operation of the driver is not limited to the brake pedal. In addition, elastic member 30 may be omitted.

The brake operation state detecting section 101 is not limited to be on a basis of the detection signal of stroke sensor 92 but may detect the brake operation state on a basis of a detection signal or an estimated value of another sensor (depression force sensor or so forth).

The invention graspable from the embodiment will be listed below.

(5) The brake system as set forth in claim 1, wherein the second brake liquid pressure creation apparatus includes a suction oil passage connecting directly the suction port and the suction section of pump.

Thus, the suction port and the suction section are directly connected not via the internal reservoir or so forth so that a large sizing of the first brake liquid pressure creation apparatus can be suppressed.

(6) The brake device as set forth in item (5), wherein the second brake liquid pressure creation apparatus includes: a pump; a gate out valve disposed in a first oil passage connecting a drain section of the pump and a drain port; a second oil passage branched from a branch section between the drain section of the pump in the first oil passage and gate out valve and connected to the wheel cylinder; a pressure increase valve installed in the second oil passage; a pressure decrease oil passage connecting the second oil passage and the suction oil passage; and a pressure decrease valve disposed in the pressure decrease oil passage.

Thus, the second brake liquid pressure creation apparatus can be provided by a small modification of the existing system.

(7) The brake device as set forth in item (6), wherein a third oil passage connecting a part of the first oil passage between the drain section of the pump and a branch section and the suction oil passage is disposed and a proportional control valve is disposed in the third oil passage.

Thus, a motor control can be simplified.

(8) The brake device as set forth in item (6), wherein the second brake liquid pressure creation apparatus controls the gate out valve in a valve closure direction, controls the pressure increase valve in a valve open direction, controls the pressure decrease valve in the valve closure direction, and executes a pressure increase control of driving the pump.

Hence, in an easy control, the pressure increase control can be executed.

(9) The brake device as set forth in item (6), wherein the second brake liquid pressure creation apparatus controls the gate out valve in a valve closure direction, controls the pressure increase valve in the valve closure direction, controls the pressure decrease valve in a valve open direction, and executes a pressure decrease control stopping the pump.

Thus, in an easy control, the pressure decrease control can be executed.

(10) The brake device as set forth in claim 1, wherein a predetermined gap is provided between the brake operation member and the piston and an elastic member is disposed in the gap which is elastically deformed according to the operation of the brake operation member.

Thus, the elastic member can create an operation feeling of the brake operation member.

(11) A brake device used in a vehicle in which a regenerative braking apparatus is equipped, comprising:

a brake operation state detecting section configured to detect an operation state of a brake operation member by a driver;

a pump creating a wheel cylinder liquid pressure on a basis of the brake operation state detected by the brake operation state detecting section;

a master cylinder generating a brake liquid pressure in response to the operation of the brake operation member, the master cylinder including:

a bottomed cylindrical cylinder main body having a first liquid chamber, in which a drain port connected to wheel cylinders is equipped, generating the liquid pressure according to the brake operation by the driver and a second liquid chamber in which a suction port connecting a suction section of the pump and an auxiliary supply port communicated with a reservoir are equipped;

a piston slidably inserted through an inner peripheral surface of the cylinder main body and interlinked with the brake operation member;

a first piston seal sealing between an inner peripheral surface of the cylinder main body and an outer peripheral surface of the piston to define the first liquid chamber;

a second piston seal to define the second liquid chamber together with the first piston seal; and a third piston seal interposed between the first piston seal and the second piston seal, sealing between the inner peripheral surface of the cylinder main body and the outer peripheral surface of the piston, and interrupting the auxiliary supply port and the suction port when the piston strokes a distance equal to or longer than a predetermined stroke;

a first system connecting the first liquid chamber and the wheel cylinders;

a second system including the pump and connecting the second liquid chamber and the wheel cylinders;

a first brake liquid pressure creation apparatus creating the wheel cylinder liquid pressure through the first system in a first state in which the auxiliary supply port and the suction port are communicated and when the piston stroke is equal to or longer than a predetermined stroke; and a second brake liquid pressure creation apparatus creating the wheel cylinder liquid pressure through the second system when the regenerative braking apparatus is operated.

Thus, when the first brake liquid pressure creation apparatus is used in a state in which the piston stroke is equal to or shorter than the predetermined stroke, the auxiliary supply port of the second liquid chamber and the suction port are communicated. Hence, the liquid pressure of the second liquid chamber does not become high and no high pressure is acted upon the pump. Consequently, the reduction of the durability can be suppressed.

(12) The brake device as set forth in item (11), wherein the second brake liquid pressure creation apparatus comprises: the pump; a gate out valve disposed in a first oil passage connecting a drain section of the pump and a drain port; a second oil passage branched between the drain section of the pump in the first oil passage and gate out valve and connected to the wheel cylinders; a pressure increase valve disposed in second oil passage; a suction oil passage connecting the suction port and the suction section of pump; a pressure decrease oil passage connecting the second oil passage and the suction oil passage; and a pressure decrease valve disposed in the pressure decrease oil passage.

Thus, the second brake liquid pressure creation apparatus can be provided by the small modification of the existing system.

(13) The brake system as set forth in item (12), wherein the second brake liquid pressure creation apparatus includes a pressure decrease control section pressure decreasing the wheel cylinder liquid pressure involved in an increase of a braking force of the regenerative braking apparatus when the first brake liquid pressure creation apparatus or the second liquid pressure creation apparatus generates the wheel cylinder liquid pressure, the pressure decrease control section controlling the gate out valve in a valve closure direction, controlling the pressure increase valve in the valve closure direction, controlling the pressure decrease valve in a valve open direction, and stopping the pump.

Thus, the second system (second brake liquid pressure creation apparatus) can control the valves described above in a BBW manner. Hence, while the controllability is improved, a worsening of a pedal feeling can be suppressed.

(14) The brake apparatus as set forth in item (12), wherein a third oil passage connecting a part of the first oil passage between the drain section of the pump and the branch section and the suction oil passage is disposed and a proportional control valve is disposed in the third oil passage.

Thus, the motor control can be simplified.

(16) The brake device as set forth in item (11), wherein a predetermined gap is provided between the brake operation member and the piston and an elastic member is disposed in the gap which is elastically deformed according to the operation of the brake operation member.

Thus, the elastic member can create an operation feeling of the brake operation member.

(17) A brake device in which a master cylinder generating a brake liquid pressure in response to an operation of a brake operation member by a driver is equipped, the master cylinder comprising:
a bottomed cylindrical cylinder main body having a first liquid chamber, in which a drain port connected to a wheel cylinder is equipped, generating a liquid pressure in response to the brake operation of the driver and a second liquid chamber in which a suction port connected to a suction section of the pump and an auxiliary supply port communicated with a reservoir are equipped;
a piston slidably inserted through an inner peripheral surface of the cylinder main body and interlinked with the brake operation member;
a first piston seal sealing between an inner peripheral surface of the cylinder main body and an outer peripheral surface of the piston to define the first liquid chamber;
a second piston seal to define the second liquid chamber together with the first piston seal; and a third piston seal interposed between the first piston seal and the second piston seal, sealing between the inner peripheral surface of the cylinder main body and the outer peripheral surface of the piston, interrupting the auxiliary supply port and the suction port when the piston strokes by a distance equal to or longer than a predetermined stroke, and communicating the auxiliary supply port and the suction port when the piston stroke is shorter than a predetermined stroke.

Thus, since the auxiliary supply port of the second liquid chamber and suction port are communicated when the first brake liquid pressure creation apparatus is used in the state in which the piston stroke is shorter than the predetermined stroke, the liquid pressure of the second liquid chamber does not become high and no high pressure is acted upon the pump. Consequently, the reduction of the durability can be suppressed.

(18) The brake device as set forth in item (17), wherein each of first, second, and third piston seals is disposed within an annular groove formed on an inner peripheral wall of the cylinder main body, the piston includes: a first large diameter section on which the first piston seal is slidably contacted; a second large diameter section on which the second piston seal is slidably contacted; and a small diameter section formed between the first large diameter section and the second large diameter section and the third piston seal is disposed at a position surrounding the small diameter section between the auxiliary supply port and suction port when the piston stroke is shorter than the predetermined stroke and is slidably contacted on the second large diameter section when the piston stroke is equal to or longer than the predetermined stroke.

Thus, the mechanical structure can achieve the effect of item (17).

(19) The brake device as set forth in item (18), wherein each of the first, second, and third piston seals is a cup seal allowing a flow of the brake liquid in a uni-direction, the first piston seal being disposed in a direction allowing only a flow of the brake liquid toward the first liquid chamber, the third piston seal being disposed in a direction allowing only a flow of the brake liquid from auxiliary supply port to the suction port, and the second piston seal being disposed in a direction suppressing a flow of the brake liquid from the second liquid chamber.

Thus, the mechanical structure can achieves the effect.

(20) The brake device as set forth in item (19), wherein the brake device further comprises: a first system connecting the first liquid chamber to a wheel cylinder; a second system including the pump and connecting the second liquid chamber and the wheel cylinder;
a first brake liquid pressure creation apparatus creating a wheel cylinder liquid pressure through the first system in a first state in which the auxiliary supply port and the suction port are communicated and when the piston stroke is equal to or longer than the predetermined stroke; and a second brake liquid pressure creation apparatus creating the wheel cylinder liquid pressure through the second system when a regenerative braking apparatus is operated.

Thus, since the auxiliary supply port of the second liquid chamber and the suction port are communicated when the first brake liquid pressure creation apparatus is used in the state in which the piston stroke is equal to or shorter than predetermined stroke, the liquid pressure at the second liquid chamber does not become high. Hence, no high pressure is acted upon the pump. Consequently the reduction of the durability can be suppressed.

EXPLANATION OF SIGNS

2 . . . brake pedal (brake operation member)
4 . . . reservoir
5 . . . master cylinder
51 . . . first liquid chamber
52 . . . second liquid chamber
53 . . . cylinder main body
531 . . . drain port
532 . . . auxiliary supply port
533 . . . suction port
54 . . . piston
551 . . . first piston seal
552 . . . second piston seal
553 . . . third piston seal
7 . . . pump
70 . . . suction section
8 . . . wheel cylinder
100 . . . electronic control unit
101 . . . brake operation state detecting section

The invention claimed is:
1. A brake device comprising:
a brake operation state detecting section configured to detect an operation state of a brake operation member by a driver;
a pump creating a wheel cylinder liquid pressure on a basis of the brake operation state detected by the brake operation state detecting section;
a bottomed cylindrical cylinder main body having a first liquid chamber, in which a drain port connected to a wheel cylinder is equipped, generating a liquid pressure in response to the brake operation by the driver and a second liquid chamber in which a suction port connected to a suction section of the pump and an auxiliary supply port communicated with a reservoir are equipped;
a piston slidably inserted through an inner peripheral surface of the cylinder main body and interlinked with the brake operation member;
a master cylinder in which a first piston seal sealing between an inner peripheral surface of the cylinder main body and an outer peripheral surface of the piston to define the first liquid chamber, a second piston seal to define the second liquid chamber together with the first piston seal, and a third piston seal sealing the inner peripheral surface of the cylinder main body and the outer peripheral surface of the piston and interrupting the auxiliary supply port and the suction port when the piston strokes by a distance equal to or longer than a predetermined stroke are equipped;
a first brake liquid pressure creation apparatus creating the wheel cylinder liquid pressure through the liquid pressure of the first liquid chamber in a first state in which the auxiliary supply port and the suction port are communicated and in a second state in which the auxiliary supply port and the suction port are interrupted when the piston strokes by a distance equal to or longer than a predetermined stroke; and
a second brake liquid pressure creation apparatus creating the wheel cylinder liquid pressure by sucking the brake liquid within the reservoir through the pump via the auxiliary supply port, the second liquid chamber, and the suction port.

2. The brake device as claimed in claim 1, wherein the wheel cylinder liquid pressure is created by the first brake liquid pressure creation apparatus when a start of the brake operation is detected by the brake operation state detecting section.

3. The brake device as claimed in claim 2, wherein the brake device further comprises a target wheel cylinder liquid pressure calculating section configured to calculate a target wheel cylinder liquid pressure on a basis of the brake operation state detected by the brake operation state detecting section and the second brake liquid pressure creation apparatus creates the wheel cylinder liquid pressure in a case where the calculated target wheel cylinder liquid pressure is higher than a predetermined liquid pressure.

4. The brake device as claimed in claim 1, wherein the second brake liquid pressure creation apparatus includes: the pump; a gate out valve disposed in a first oil passage connecting a drain section of the pump and a drain port; a second oil passage branched from a part of the first oil passage between the drain section of the pump and the gate out valve and connected to the wheel cylinder; a pressure increase valve disposed in the second oil passage; a suction oil passage connecting a suction port and the suction section of the pump; a pressure increase valve disposed in the second oil passage; a pressure decrease oil passage connecting the second oil passage and the suction oil passage; and a pressure decrease valve disposed in the pressure decrease oil passage.

5. The brake device as claimed in claim 1, wherein the second brake liquid pressure creation apparatus includes a suction oil passage directly connecting the suction port and the suction section of the pump.

6. The brake device as claimed in claim 5, wherein the second brake liquid pressure creation apparatus comprises: the pump; a gate out valve disposed in a first oil passage connecting a drain section of the pump and a drain port; a second oil passage branched from a branch section between the drain section of the pump in the first oil passage and the gate out valve and connected to the wheel cylinder; a pressure increase valve disposed in the second oil passage; a pressure decrease oil passage connecting between the second oil passage and the suction oil passage; and a pressure decrease valve disposed in the pressure decrease oil passage.

7. The brake device as claimed in claim 6, wherein a third oil passage connecting a part of the first oil passage between the drain section of the pump and the branch section and the suction oil passage is disposed and a proportional control valve is disposed in the third oil passage.

8. The brake device as claimed in claim 6, wherein the second brake liquid pressure creation apparatus controls the gate out valve in a valve closure direction, controls the pressure increase valve in a valve open direction, controls the pressure decrease valve in the valve closure direction, and executes a pressure increase control of driving the pump.

9. The brake device as claimed in claim 6, wherein the second brake liquid pressure creation apparatus controls the gate out valve in a valve closure direction, controls the pressure increase valve in the valve closure direction, controls the pressure decrease valve in a valve open direction, and executes a pressure decrease control of stopping the pump.

10. The brake device as claimed in claim 1, wherein a predetermined gap is provided between the brake operation member and the piston and an elastic member is disposed in the gap which is elastically deformed according to the operation of the brake operation member.

11. A brake device used in a vehicle in which a regenerative braking apparatus is equipped, comprising:
a brake operation state detecting section configured to detect an operation state of a brake operation member by a driver;
a pump creating a wheel cylinder liquid pressure on a basis of the brake operation state detected by the brake operation state detecting section; and
a master cylinder generating a brake liquid pressure in response to the operation of the brake operation member, the master cylinder including:
a bottomed cylindrical cylinder main body having a first liquid chamber, in which a drain port connected to a wheel cylinder is equipped, generating a liquid pressure in response to the brake operation by the driver and a second liquid chamber in which a suction port connecting a suction section of the pump and an auxiliary supply port communicated with a reservoir are equipped;
a piston slidably inserted through an inner peripheral surface of the cylinder main body and interlinked with the brake operation member;
a first piston seal sealing between an inner peripheral surface of the cylinder main body and an outer peripheral surface of the piston to define the first liquid chamber;
a second piston seal to define the second liquid chamber together with the first piston seal chamber; and
a third piston seal interposed between the first piston seal and the second piston seal, sealing between the inner peripheral surface of the cylinder main body and the outer peripheral surface of the piston, and interrupting the auxiliary supply port and the suction port when the piston strokes by a distance equal to or longer than a predetermined stroke;

a first system connecting the first liquid chamber and the wheel cylinder;

a second system including the pump and connecting the second liquid chamber and the wheel cylinder;

a first brake liquid pressure creation apparatus creating the wheel cylinder liquid pressure through the first system in a first state in which the auxiliary supply port and the suction port are communicated and when the piston strokes by a distance equal to or longer than the predetermined stroke; and a second brake liquid pressure creation apparatus creating the wheel cylinder liquid pressure through the second system when the regenerative braking apparatus is operated.

12. The brake device as claimed in claim 11, wherein the second brake liquid pressure creation apparatus comprises: the pump; a gate out valve disposed in a first oil passage connecting a drain section of the pump and a drain port; a second oil passage branched from a part of the first oil passage between the drain section of the pump and gate out valve and connected to the wheel cylinder; a pressure increase valve disposed in second oil passage; a suction oil passage connecting suction port and a suction section of the pump; a pressure decrease oil passage connecting the second oil passage and the suction oil passage; and a pressure decrease valve disposed in pressure decrease oil passage.

13. The brake device as claimed in claim 12, wherein the second brake liquid pressure creation apparatus includes a pressure decrease control section pressure decreasing the wheel cylinder liquid pressure involved in an increase of a braking force of the regenerative braking apparatus when the first brake liquid pressure creation apparatus or the second liquid pressure creation apparatus generates the wheel cylinder liquid pressure, the pressure decrease control section controlling the gate out valve in a valve closure direction, controlling the pressure increase valve in the valve closure direction, controlling the pressure decrease valve in a valve open direction, and stopping the pump.

14. The brake device as claimed in claim 12, wherein a third oil passage connecting a part of the first oil passage between the drain section of the pump and a branch section and the suction oil passage is disposed and a proportional control valve is disposed in the third oil passage.

15. The brake device as claimed in claim 14, wherein the second brake liquid pressure creation apparatus includes a pressure decrease control section pressure decreasing the wheel cylinder liquid pressure involved in an increase of a braking force of the regenerative braking apparatus when the first brake liquid pressure creation apparatus or the second liquid pressure creation apparatus generates the wheel cylinder liquid pressure, the pressure decrease control section controlling the gate out valve in a valve closure direction, controlling the pressure increase valve in the valve closure direction, controlling the pressure decrease valve in a valve open direction, and stopping the pump.

16. The brake device as claimed in claim 11, wherein a predetermined gap is provided between the brake operation member and the piston and an elastic member is disposed in the gap which is elastically deformed according to the operation of the brake operation member.

17. A brake device in which a master cylinder generating a brake liquid pressure in response to an operation of a brake operation member by a driver is equipped, the master cylinder comprising:

a bottomed cylindrical cylinder main body having a first liquid chamber, in which a drain port connected to a wheel cylinder is equipped, generating a liquid pressure in response to the brake operation by the driver, and a second liquid chamber in which a suction port connected to a suction section of the pump and an auxiliary supply port communicated with a reservoir are equipped;

a piston slidably inserted through an inner peripheral surface of the cylinder main body and interlinked with the brake operation member;

a first piston seal sealing between an inner peripheral surface of the cylinder main body and an outer peripheral surface of the piston to define the first liquid chamber;

a second piston seal to define the second liquid chamber together with the first piston seal; and a third piston seal interposed between the first piston seal and the second piston seal, sealing between the inner peripheral surface of the cylinder main body and the outer peripheral surface of the piston, interrupting the auxiliary supply port and the suction port when the piston strokes by a distance equal to or longer than a predetermined stroke, and communicating the auxiliary supply port and the suction port when the piston strokes by a distance shorter than the predetermined stroke.

18. The brake device as claimed in claim 17, wherein each of the first, second, and third piston seals is disposed within an annular groove formed on an inner peripheral wall of the cylinder main body, the piston includes: a first large diameter section on which the first piston seal is slidably contacted; a second large diameter section on which the second piston seal is slidably contacted; and a small diameter section formed between the first large diameter section and the second large diameter section and the third piston seal is disposed at a position surrounding the small diameter section between the auxiliary supply port and suction port when a stroke of the piston is shorter than a predetermined stroke and is slidably contacted on the second large diameter section when the piston stroke is equal to or longer than the predetermined stroke.

19. The brake device as claimed in claim 18, wherein each of the first, second, and third piston seals is a cup seal allowing a flow of the brake liquid in a uni-direction, the first piston seal being disposed in a direction allowing only a flow of the brake liquid toward the first liquid chamber, the third piston seal being disposed in a direction allowing only a flow of the brake liquid from the auxiliary supply port to the suction port, and the second piston seal being disposed in a direction suppressing a flow of the brake liquid from the second liquid chamber.

20. The brake device as claimed in claim 19, wherein the brake device further comprises: a first system connecting the first liquid chamber and the wheel cylinder; a second system including the pump and connecting the second liquid chamber and the wheel cylinder; a first brake liquid pressure creation apparatus creating a wheel cylinder liquid pressure through the first system in a first state in which the auxiliary supply port and the suction port are communicated and when a piston stroke to is equal to or longer than a predetermined stroke; and a second brake liquid pressure creation apparatus creating the wheel cylinder liquid pressure through the second system when a regenerative braking apparatus is operated.

* * * * *